US005881171A

United States Patent [19]

Kinjo

[11] Patent Number: 5,881,171
[45] Date of Patent: Mar. 9, 1999

[54] METHOD OF EXTRACTING A SELECTED CONFIGURATION FROM AN IMAGE ACCORDING TO A RANGE SEARCH AND DIRECTION SEARCH OF PORTIONS OF THE IMAGE WITH RESPECT TO A REFERENCE POINT

[75] Inventor: Naoto Kinjo, Kanagawa, Japan

[73] Assignee: Fuji Photo Film Co., Ltd., Kanagawa, Japan

[21] Appl. No.: 707,287

[22] Filed: Sep. 3, 1996

[30]     Foreign Application Priority Data

Sep. 13, 1995   [JP]   Japan  .................................... 7-235730
Apr. 12, 1996   [JP]   Japan  .................................... 8-091113

[51] Int. Cl.$^6$ ...................................................... G06K 9/46
[52] U.S. Cl. ............................................ 382/199; 382/203
[58] Field of Search ..................................... 382/197, 199, 382/202, 203, 204

[56]                    References Cited

U.S. PATENT DOCUMENTS

| | | | |
|---|---|---|---|
| 4,428,077 | 1/1984 | Shimada et al. ............................. | 382/9 |
| 4,644,583 | 2/1987 | Watanabe et al. ......................... | 382/22 |
| 4,731,858 | 3/1988 | Grasmueller et al. ...................... | 382/9 |
| 5,033,099 | 7/1991 | Yamada et al. ............................ | 382/21 |
| 5,212,739 | 5/1993 | Johnson ..................................... | 382/9 |
| 5,278,921 | 1/1994 | Nakamura et al. ........................ | 382/18 |
| 5,497,431 | 3/1996 | Nakamura ................................. | 382/162 |
| 5,586,199 | 12/1996 | Kanda et al. ............................. | 382/197 |
| 5,604,822 | 2/1997 | Pearson et al. ........................... | 382/199 |

FOREIGN PATENT DOCUMENTS

| 4-346332 | 12/1992 | Japan | ............................... G03B 27/73 |
|---|---|---|---|
| 6-160993 | 6/1994 | Japan | ............................... G03B 27/73 |

Primary Examiner—Andrew W. Johns
Attorney, Agent, or Firm—Sughrue, Mion, Zinn, Macpeak & Seas, PLLC

[57]                    ABSTRACT

A method of extracting a specific configuration including: measuring a density or luminance of portions of an image; determining a change in density or luminance for each direction at each portion of the image. Based on the results of the measurement, setting a reference point corresponding to a portion whose amount of change along a predetermined direction of the image is greater than or equal to a predetermined value; setting a search range, corresponding to a distance from the reference point which is within an angle range with respect to the reference point. The angle range is determined in accordance with a contour configuration of the region based on a direction determined in advance or a direction in change in density or luminance at the reference point which is greater than or equal to a predetermined value; and setting a search direction pattern in the search range which expresses a direction in which the density or luminance changes, and searching for portions which exist within the search range and whose amount of change in density or luminance along a direction expressed by the search direction is greater than or equal to a predetermined value; and when a portion which satisfies a search condition is detected, repeating setting of a detected portion as a next reference point; and extracting the line formed by connecting a plurality of reference points as the contour line.

12 Claims, 25 Drawing Sheets

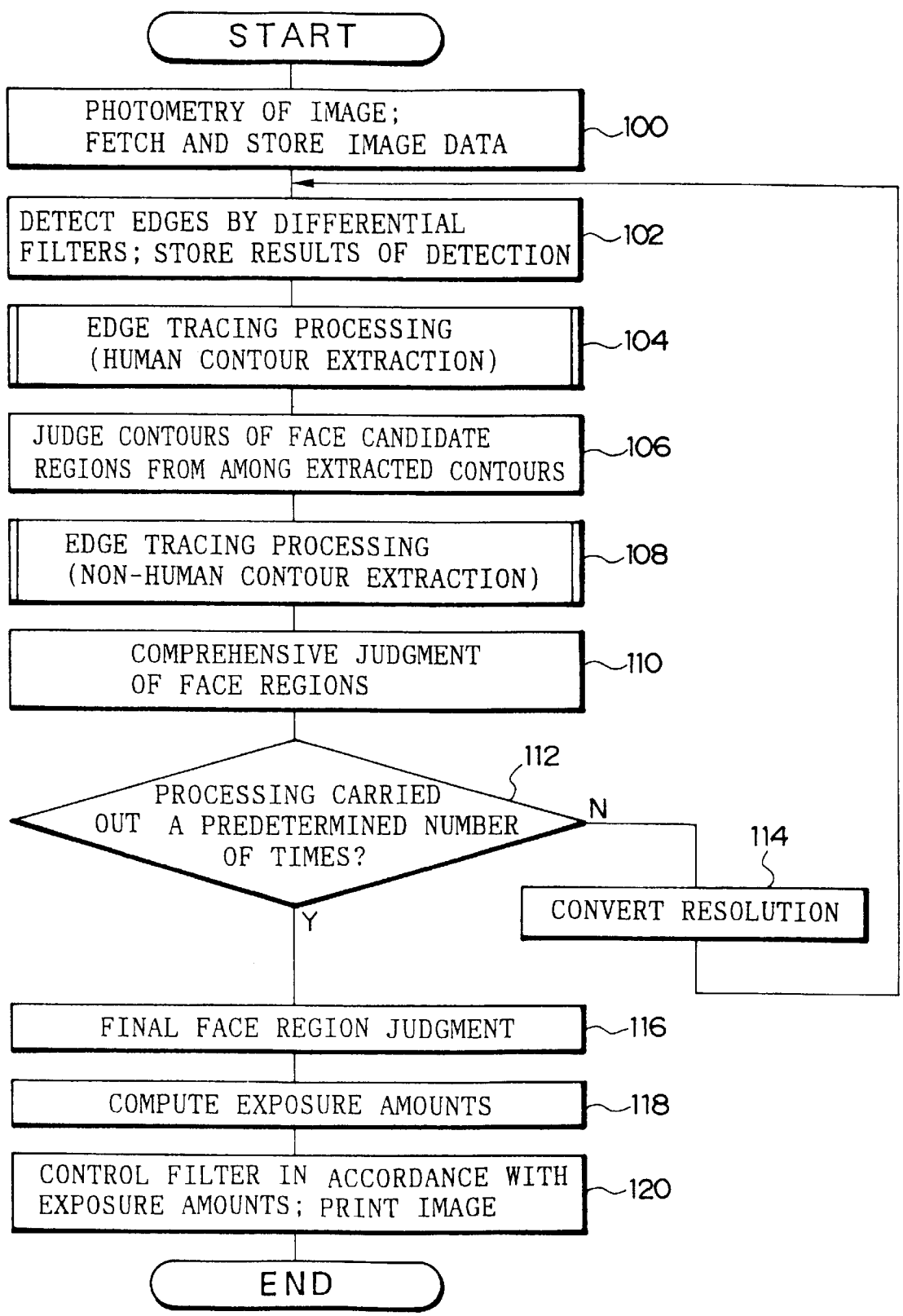

FIG. 5A
SEARCH FOR TRACING
STARTING POINT
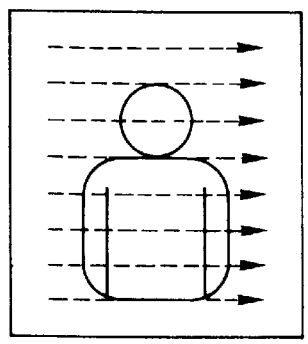
FIG. 5B
EDGE TRACING
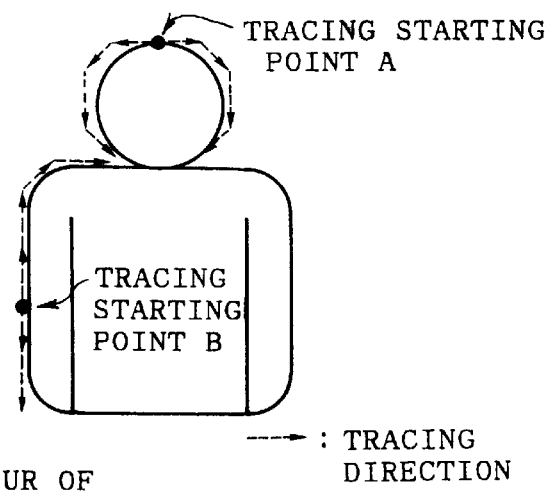
→ : TRACING
    DIRECTION
FIG. 5C  JUDGMENT OF CONTOUR OF
         FACE CANDIDATE REGION
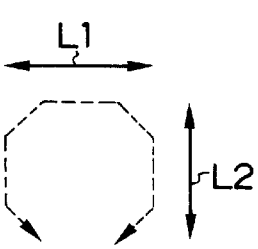
CONTOUR LINE A
DIRECTION COMPONENTS:
7 DIRECTIONS
ASPECT RATIO: 1.0
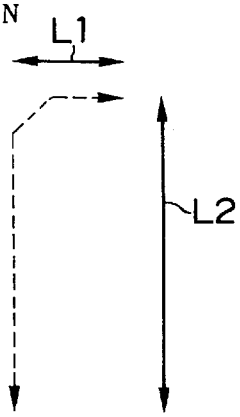
CONTOUR LINE B
DIRECTION COMPONENTS:
3 DIRECTIONS
ASPECT RATIO: 3.0
FIG. 5D  SETTING OF FACE CANDIDATE REGION
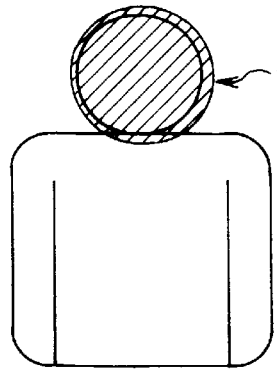
FACE CANDIDATE REGION

⟋⟋ : SEARCH RANGE

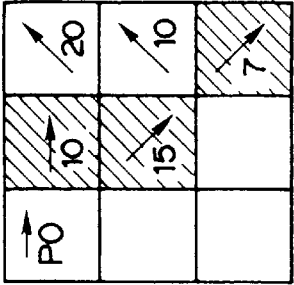

FIG. 7C

FETCH EDGE DIRECTION AND EDGE INTENSITY OF EACH PIXEL IN SEARCH RANGE

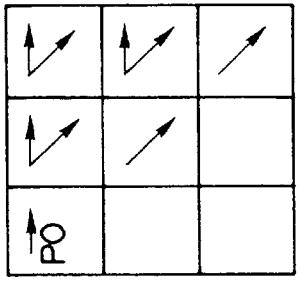

FIG. 7B

SET SEARCH EDGE DIRECTION PATTERN FOR EACH PIXEL IN SEARCH RANGE

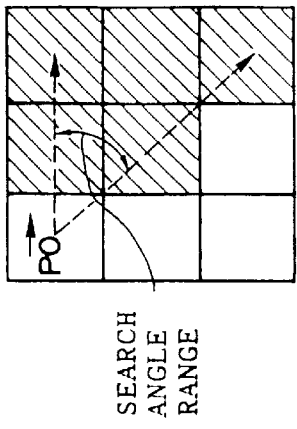

FIG. 7A

SET OF SEARCH RANGE

P0: CURRENT REFERENCE POINT
▨ : SEARCH RANGE
↑ : EDGE DIRECTION OF REFERENCE POINT

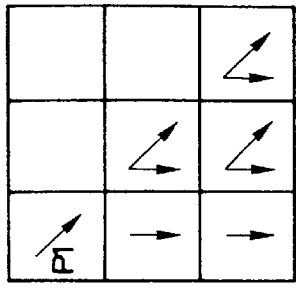

FIG. 7F

SET SEARCH EDGE DIRECTION PATTERN FOR EACH PIXEL IN SEARCH RANGE

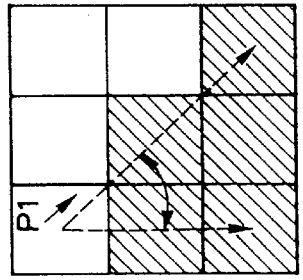

FIG. 7E

SET SEARCH RANGE

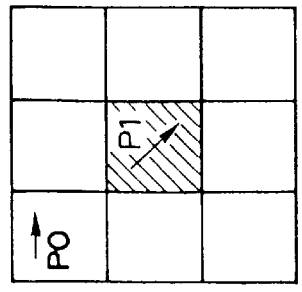

FIG. 7D

SET NEXT REFERENCE POINT (REFERENCE POINT MOVES P0 → P1)

FIG. 9A

HUMAN REGION: A CASE IN WHICH AN EDGE IS TRACED FOR A LARGE IMAGE OF A COARSE RESOLUTION

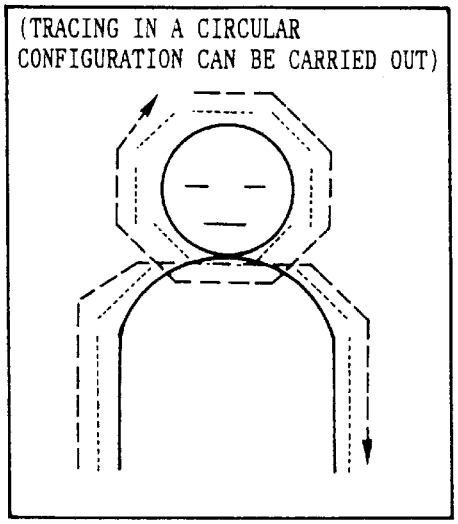

(TRACING IN A CIRCULAR CONFIGURATION CAN BE CARRIED OUT)

FIG. 9B

HUMAN REGION: A CASE IN WHICH AN EDGE IS TRACED FOR A SMALL IMAGE OF A COARSE RESOLUTION

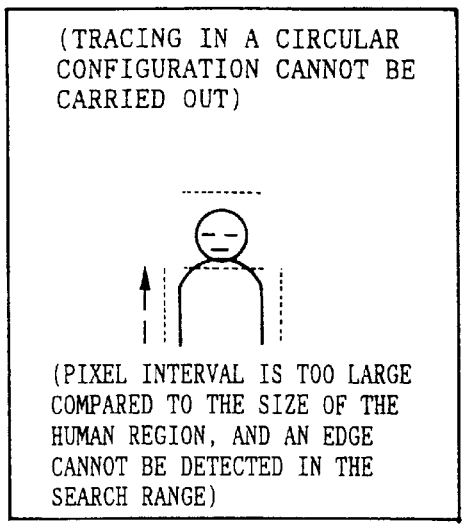

(TRACING IN A CIRCULAR CONFIGURATION CANNOT BE CARRIED OUT)

(PIXEL INTERVAL IS TOO LARGE COMPARED TO THE SIZE OF THE HUMAN REGION, AND AN EDGE CANNOT BE DETECTED IN THE SEARCH RANGE)

FIG. 9C

HUMAN REGION: A CASE IN WHICH AN EDGE IS TRACED FOR A LARGE IMAGE OF A FINE RESOLUTION

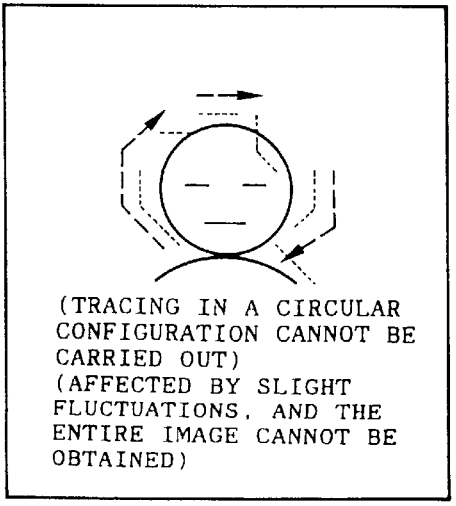

(TRACING IN A CIRCULAR CONFIGURATION CANNOT BE CARRIED OUT)
(AFFECTED BY SLIGHT FLUCTUATIONS, AND THE ENTIRE IMAGE CANNOT BE OBTAINED)

FIG. 9D

HUMAN REGION: A CASE IN WHICH AN EDGE IS TRACED FOR A SMALL IMAGE OF A FINE RESOLUTION

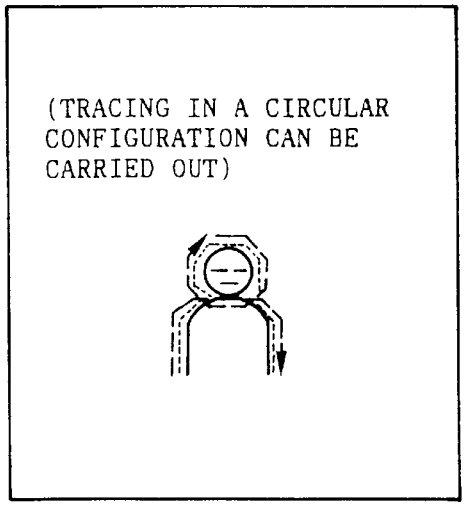

(TRACING IN A CIRCULAR CONFIGURATION CAN BE CARRIED OUT)

---------- : EDGE DIRECTION
— — — : RESULTS OF EDGE TRACING

SET SEARCH RANGE

EXTRACT CONTOUR LINES (LINES) EXISTING WITHIN SEARCH RANGE

JUDGE DEGREE OF SIMILARITY OF LINE SYMMETRY

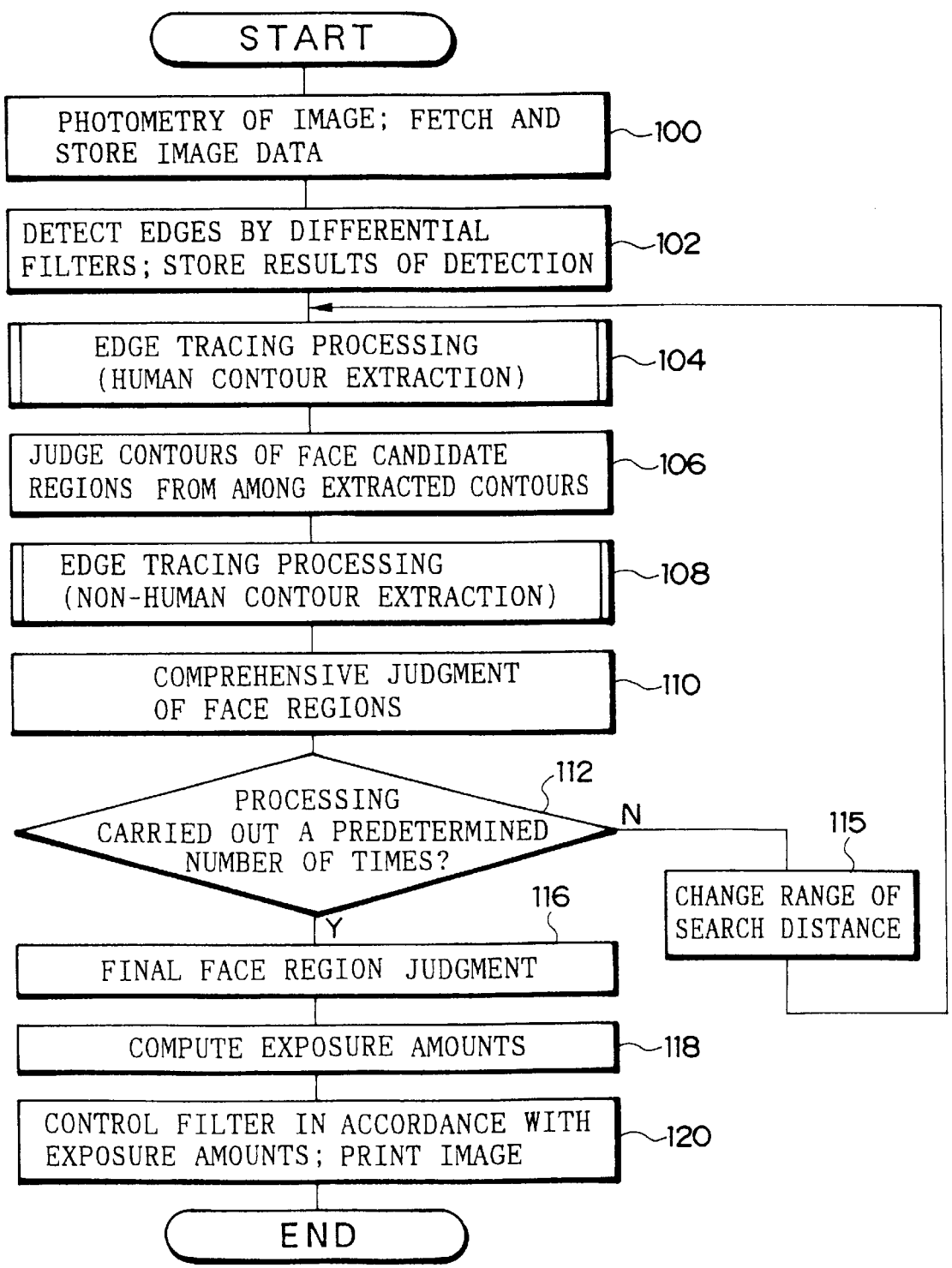

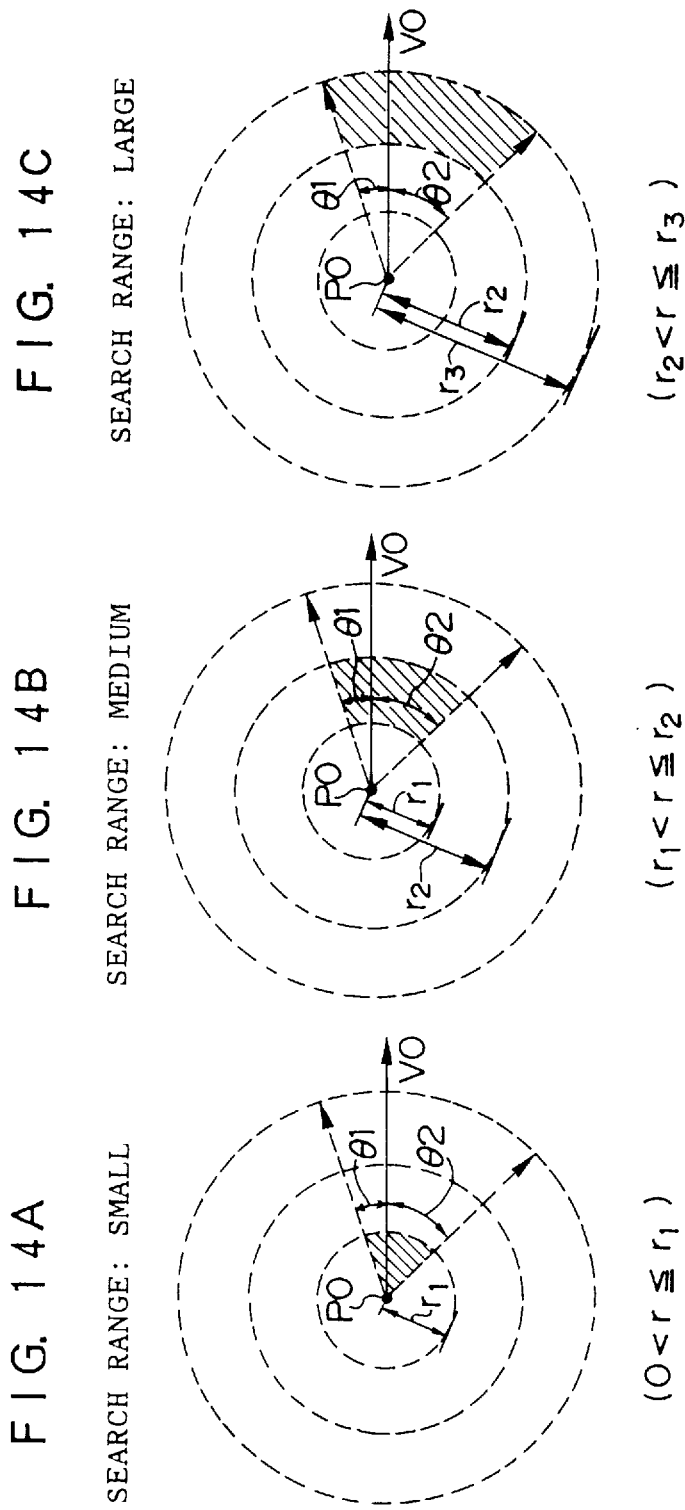

FIG. 18A
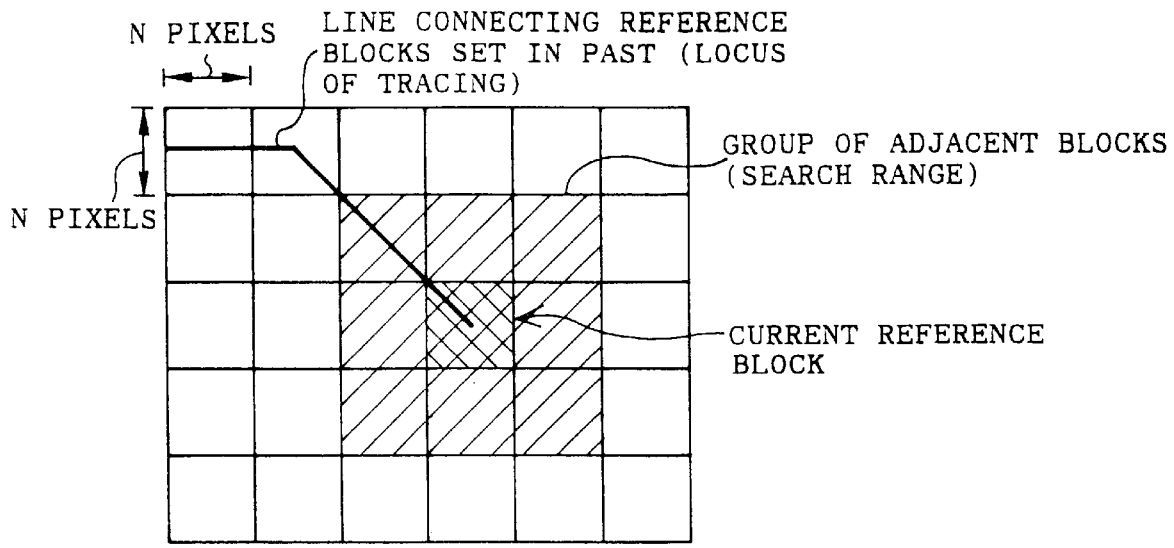
FIG. 18B
| B1 | B2 | B3 |
|---|---|---|
| B8 | B0 | B4 |
| B7 | B6 | B5 |
B0: CURRENT REFERENCE BLOCK
FIG. 18C
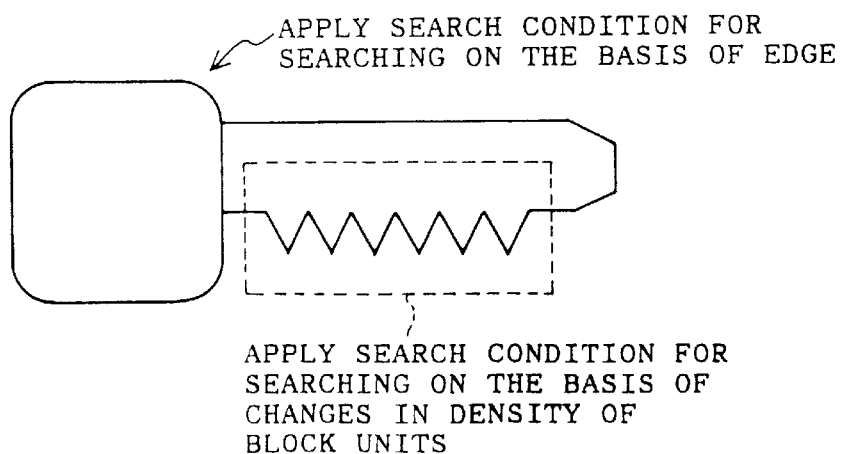

CONDITION 10: ARRIVED AT TRACING STARTING POINT
CONDITION 11: NO LEFT DIRECTION EDGE
CONDITION 12: THERE IS A LEFT DIRECTION EDGE
CONDITION 21: ALREADY COMPLETED LEFT CURVE AFTER STRAIGHT FORWARD
CONDITION 22: THERE IS A LEFT DIRECTION EDGE
CONDITION 23: ALREADY COMPLETED LEFT CURVE AFTER RIGHT CURVE
CONDITION 31: PASSED TWO RIGHT ANGLE POINTS
CONDITION 32: OTHER THAN CONDITION 31

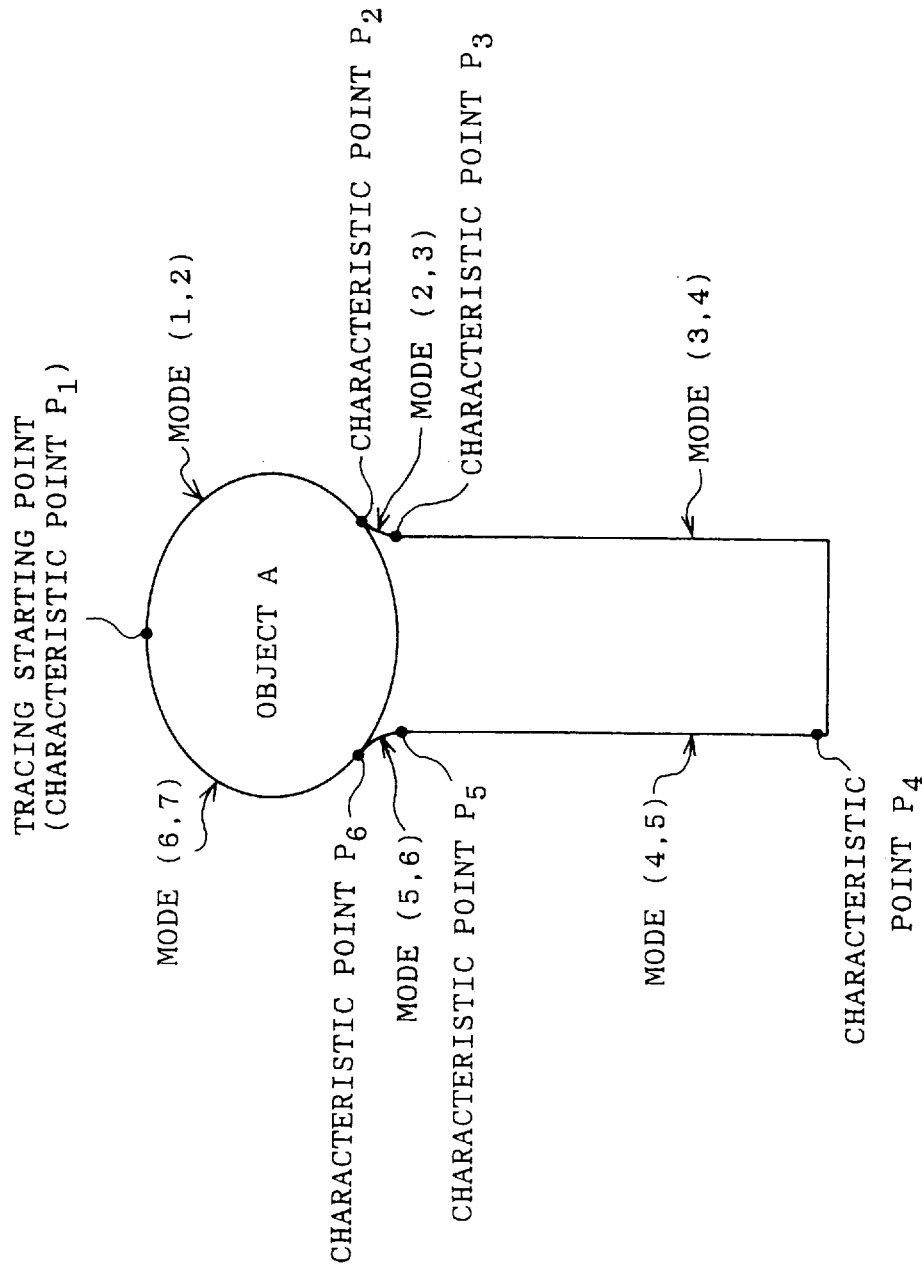

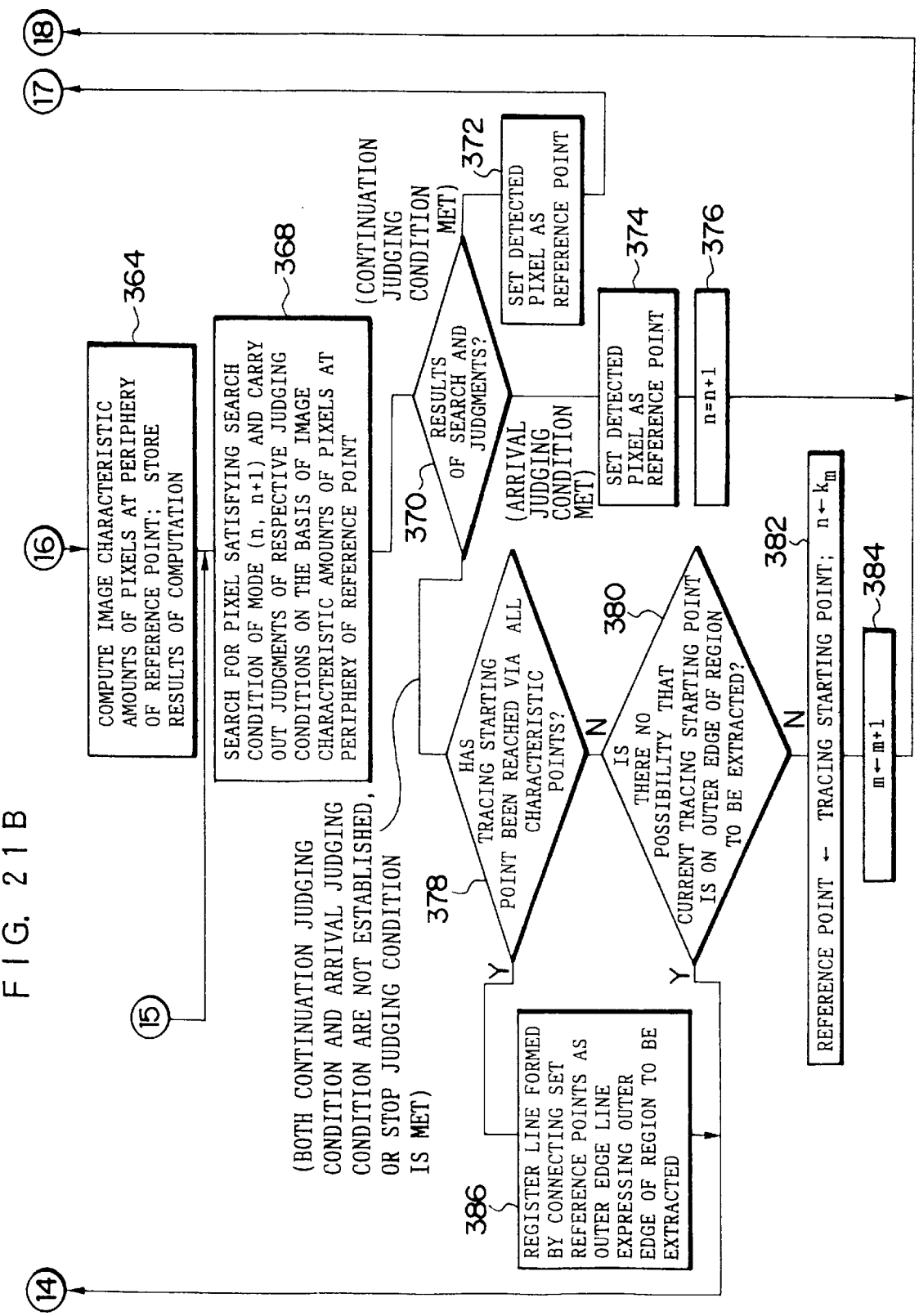

METHOD OF EXTRACTING A SELECTED CONFIGURATION FROM AN IMAGE ACCORDING TO A RANGE SEARCH AND DIRECTION SEARCH OF PORTIONS OF THE IMAGE WITH RESPECT TO A REFERENCE POINT

BACKGROUND OF THE INVENTION

1. Field of the Invention

The present invention relates to a method of extracting a region of a specific configuration, a method of extracting a specific region, and a method of determining copy conditions, and in particular, to a method of extracting a region of a specific configuration for extracting a region of a specific contour configuration from an image, and to a method of extracting a specific region for extracting from an image a specific region having a predetermined characteristic, and to a method of determining copy conditions for determining copy conditions by using the aforementioned methods of extracting.

2. Description of the Related Art

When a photograph of a person is viewed, the region which is most noticed is the person's face. When, for example, an original image recorded on a film or the like is to be printed onto a copy material such as photographic printing paper, the exposure amounts must be determined such that the color of the person's face is printed at an appropriate color.

Therefore, conventionally, a film image is divided into a plurality of regions which have been fixedly determined in advance, on the basis of the empirical principle that in a photograph of a person, there is a high probability that the person will be positioned in the substantially central portion of the image. The respective regions are weighted, with the weights of the regions positioned in the substantially central portion of the image being the greatest. Weighted average values of the transmission densities of the three colors of each of the regions are determined, and the exposure amounts are determined on the basis of the weighted average values.

In the above-described method, if a person actually is positioned in a vicinity of the substantially central portion of the image, exposure amounts for printing the person appropriately can be obtained. However, a drawback arises in that in a case in which the person is positioned at a position which is distant from the central portion of the image, the proper exposure amounts cannot be obtained. Further, for images in which it is easy for density failure or color failure to occur, as in the case of images photographed by using an electronic flash or images in which a backlit scene is photographed or the like, a drawback arises in that it is difficult to obtain the appropriate exposure amounts.

The applicants of the present application have proposed the following method of determining exposure amounts in Japanese Patent Application Laid-Open (JP-A) No. 4-346332. A color original image is divided into a plurality of pixels, and each pixel is divided into three colors of R, G, B and photometrically measured. A histogram for the hue values (and the saturation values) is determined on the basis of the photometric data. The histogram is divided per mountain, and for each pixel, a determination is made as to which of the divisional mountains the pixel belongs. The pixels are divided into groups corresponding to the divisional mountains. The color original image is divided into a plurality of regions per group (so-called clustering). Among the plurality of regions, a region is assumed to correspond to the face of a person, and the exposure amounts are determined on the basis of the photometric data of the region assumed to be a person's face.

Further, Japanese Patent Application Laid-Open (JP-A) No. 6-160993 discloses the following method by which the probability of extracting a region corresponding to a person's face is increased. The regions contacting the outer edge of the image are judged to be background regions and are excluded. An extracted region is diagramed, and on the basis of the configuration of the extracted region and the configurations of the neighboring regions positioned at the periphery of the extracted region, a determination is made as to whether the extracted region is a region corresponding to a person's face.

However, there may be for example flesh-colored regions such as ground, tree trunks, or the like in the original image, and the hue and saturation of such flesh-colored regions may approximate the hue and saturation of a region corresponding to a person's face in the image. In such cases, with the above-described methods, such a region may be mistakenly judged to be a region corresponding to a person's face. Further, when such a flesh-colored region is adjacent to a region corresponding to a person's face, there are cases in which the flesh-colored region and the region corresponding to the person's face cannot be separated and the original image cannot be divided into regions of proper ranges. In the above-described conventional art, processing is carried out on the premise that one of the divisional regions is a region corresponding to a person's face. Therefore, in a case in which the original image cannot be divided into regions of proper ranges, a drawback arises in that a region corresponding to a person's face will be judged mistakenly, and exposure amounts enabling proper printing of the person's face cannot be obtained.

As one method of properly extracting a predetermined region from an image without receiving effects from the color or the like of adjacent regions, edges (points where the change in density or luminance is great) in the image are detected, and for each detected edge, the determination as to whether there exists another edge in the periphery of that edge is repeated so that a plurality of contour lines, which are respectively formed by edges running together in a row, are extracted. For each of the extracted contour lines, a process such as pattern matching with the contour configuration of the predetermined region is carried out, and a determination is made as to whether the contour line is a contour line which corresponds to the contour of the predetermined region. The predetermined region is extracted in this way. Because the contour of a region corresponding to a person's face is substantially elliptical, in the above-described method, it is possible to extract a region assumed to correspond to a person's face by determining, from among the plurality of extracted contour lines, a contour line which corresponds to the contour of a substantially elliptical region.

However, processing for extracting a plurality of contour lines from an image and processing for determining, from among the plurality of extracted contour lines, a contour line corresponding to the contour of a predetermined region which is to be extracted are extremely complicated. A drawback arises in that when a region corresponding to a person's face or the like is to be extracted from an image by using the above-described method, processing requires an extremely long time.

SUMMARY OF THE INVENTION

In view of the aforementioned, an object of the present invention is to provide a method of extracting a region of a specific configuration and a method of extracting a specific region in which a region to be extracted which exists in an image can be extracted quickly and accurately.

Another object of the present invention is to provide a method of determining copy conditions in which a region existing in an image and corresponding to a person's face is quickly extracted, and copy conditions enabling proper printing of the region corresponding to a person's face can be obtained in a short time.

If the contour configuration of the region to be extracted from the image is known and the position of a point among the plurality of points forming the contour line of the region is known, an approximate position of the next point forming the contour line and the direction in which the contour line extends at this point can be estimated on the basis of the contour configuration of the region.

In the method of extracting a region of a specific configuration relating to a first aspect of the present invention, in the extraction of a region of a specific contour configuration which region exists in the image: a density or a luminance of each of a plurality of portions of the image is measured; an amount of change in density or an amount of change in luminance is determined for each direction at each of the portions of the image on the basis of the results of measurement of the density or the luminance; a portion, whose amount of change in density along a predetermined direction of the image or whose amount of change in luminance along a predetermined direction of the image is greater than or equal to a predetermined value, is set as a reference point; a range, whose distance from the reference point is within a predetermined range and which is within an angle range with respect to the reference point, is set as a search range, the angle range being determined in accordance with a contour configuration of said region on the basis of a direction determined fixedly in advance or a direction in which the amount of change in density at the reference point or the amount in change in luminance at the reference point is greater than or equal to a predetermined value; a search direction pattern, which is to be searched at respective portions in said search range and which expresses a direction in which the density or the luminance changes, is set in accordance with the contour configuration of said region on the basis of a direction determined fixedly in advance or a direction in which the amount of change in density at the reference point or the amount in change in luminance at the reference point is greater than or equal to a predetermined value; portions are searched for which exist within said search range and whose amount of change in density along a direction expressed by said search direction pattern or amount of change in luminance along the direction expressed by said search direction pattern is greater than or equal to a predetermined value; and in a case in which a portion which satisfies a search condition is detected, setting of the detected portion as the next reference point is repeated; and a line, which is formed by connecting a plurality of portions of the image which were set in order as reference points, is extracted as a contour line expressing the contour of said region.

In the above-described first aspect, a portion, for which the amount of change in density or luminance along a predetermined direction of the image is greater than or equal to a predetermined value, is set as the reference point. Thereafter, a range, in which it is assumed that the next reference point corresponding to the contour line of the region to be extracted exists, is set as the search range. More specifically, a range whose distance from the reference point is within a predetermined range and which is in an angle range with respect to a reference point and determined in accordance with the contour configuration of the region to be extracted, on the basis of a direction determined fixedly in advance or a direction in which the amount of change in the density or the luminance at the reference point is greater than or equal to a predetermined value, is set as the search range.

A search direction pattern, which expresses the direction in which the density or the luminance changes and which is to be searched at each portion within the search range, is set in accordance with the contour configuration of the region, on the basis of a direction fixedly determined in advance or a direction in which the amount of change in density or luminance at the reference point is greater than or equal to a predetermined value. When the respective portions within the search range are respectively assumed to be the next reference point, the search direction pattern expresses the direction assumed to be the direction in which the contour line extends at each portion. (The direction in which the contour line extends is a direction substantially orthogonal to the direction in which the density or the luminance changes.)

In the first aspect, a portion, which exists within the set search range and whose amount of change in density or luminance along the direction expressed by the set search direction pattern is greater than or equal to a predetermined value, is searched for. Therefore, the search range is smaller than in conventional methods, and a portion to be set as the next reference point can be searched for in a short period of time. Further, because only those portions, for which the amount of change in density or luminance along the direction expressed by the search direction pattern is greater than or equal to a predetermined value, are searched for, only those portions having a high possibility of corresponding to the contour line of the region to be extracted are searched for. The probability of a portion set as the reference point being a portion corresponding to the contour line increases.

Only portions, which exist within a range in which it is assumed that the next reference point corresponding to the contour line of the region to be extracted exists and for which the amount of change in the density or luminance along the direction expressed by the search direction pattern (i.e., along a direction corresponding to the direction assumed to be the direction in which the contour line extends), are searched for. Therefore, in a case in which no portions satisfying the aforementioned search condition are detected, it is deemed that there is no portion ahead of the currently set reference point which corresponds to the contour line of the region to be extracted, and searching can be discontinued. In this way, it is possible to rapidly detect only portions assumed to correspond to the contour line of the region of the specific contour configuration.

A line formed by connecting the plurality of portions of the image which are set in order as reference points is extracted as a contour line expressing the contour of the region. Therefore, the region to be extracted which exists in the image can be extracted quickly, and it is difficult for the extraction processing to be affected by the color and the like of the regions existing at the periphery of the region. Therefore, the region can be extracted accurately.

In the search of the first aspect, there is the possibility that a plurality of portions are detected as portions satisfying the aforementioned search condition. In such a case, in the second aspect, it is preferable to, in the first aspect, either set as the next reference point the portion, among the plurality of portions, which has the greatest change in density or luminance along the direction expressed by the search direction pattern, or set as the next reference point the portion, among the plurality of portions, which is positioned at the position having the highest priority in accordance with a predetermined priority of the position of the next reference point with respect to the current reference point.

In this way, in a case in which a portion having the greatest change in density or luminance along the direction expressed by the search direction pattern is set as the next reference point, a portion which is assumed to have a relatively high possibility of being a portion corresponding to the contour of the region to be extracted is selected from among the plurality of detected portions. Therefore, the accuracy of extraction of a contour line of a region to be extracted is improved. Further, in a case in which the portion positioned at the position having the highest priority is set as the next reference point in accordance with a predetermined priority of the position of the next reference point with respect to the current reference point, a contour line corresponding to the contour configuration of the region can be extracted even in a case in which, for example, the change in the density or the luminance, with respect to peripheral portions, at a portion of one part of the contour line of the region is small. Therefore, in the same way as described above, the accuracy of the extraction of the contour line of the region to be extracted improves.

In the third aspect, in the first aspect, a search range and a search direction pattern are set. While a portion satisfying the search condition is searched for and setting of a detected portion as the next reference point is repeated, the position, on the contour of the region to be extracted, of the portion set as the reference point is determined, and the angle range with respect to the reference point is changed in accordance with the configuration of the contour of the region at the determined position. In this way, even if the contour configuration of the region to be extracted, for example, has convex and concave portions or is a complex configuration in which straight lines or curves or curved portions of various angles are combined, the contour line of the region can be extracted.

In the method of determining copy conditions relating to the fourth aspect, an angle range corresponding to the contour configuration of a person is set as the angle range. A contour line is extracted from the image in accordance with a method of extracting a region of a specific configuration of any one of the above-described first through third aspects. A judgment is made as to whether the region in the image, which region is demarcated by the extracted contour line, is a region corresponding to a person's face. Copy conditions for copying the image onto a copy material are determined on the basis of an image characteristic amount in a region which is judged to be a region corresponding to a person's face.

In the above description, an angle range corresponding to the contour configuration of a person is set, and the contour line is extracted by a method of extracting a region of a specific configuration of one of the above-described first through third aspects. Therefore, as described above, the contour line of a region assumed to correspond to the contour of a person can be extracted quickly. Further, in the fourth aspect, a judgment is made as to whether a region in the image, which region is surrounded by the extracted contour line, is a region corresponding to a person's face. Therefore, a region corresponding to a person's face can be extracted accurately, and copy conditions for copying the image onto a copy material are determined on the basis of an image characteristic amount in the region judged to be a region corresponding to a person's face. As a result, copy conditions, at which the region corresponding to a person's face can be printed appropriately, can be obtained in a short time.

The above-described judgment as to whether the region is a region corresponding to a person's face can be carried out by, for example, judging, for the region demarcated by the extracted contour line (the region assumed to correspond to a person's face), whether a configuration pattern assumed to correspond to a specific part of a person (e.g., the head portion or the torso of a person, or the eyes, nose or mouth forming the internal structure of the face) exists at a position corresponding to a positional relationship between a person's face and the specific part at a size and orientation corresponding to the region.

In the fifth aspect, an angle range corresponding to the contour configuration of a predetermined region whose contour configuration is different than the contour of a person is set as the angle range. The contour line is extracted by a method of extracting a region of a specific configuration of one of the first through the third aspects. A determination is made, taking into account the arrangement of the extracted line as well, as to whether the region corresponds to a person's face. The predetermined region is a region whose contour configuration is clearly different than the contour configurations of portions of a person, and can be for example a region corresponding to a man-made object such as a piece of furniture, a window, or the like.

On the basis of the arrangement of the contour line extracted as described above, it can easily be determined whether a contour line, which is extracted in accordance with the fourth aspect and assumed to be the contour of a region corresponding to a person's face, is a contour line which was extracted erroneously. The accuracy of the extraction of a region corresponding to a person's face improves even more, and it is even more probable that copy conditions for appropriately printing a region corresponding to a person's face can be obtained.

The methods of extracting a region of a specific configuration of the first through the third aspects presuppose the extraction of a region whose entire periphery is demarcated by a line which is formed by portions, whose change in density or luminance is large, being connected along directions substantially orthogonal to the directions in which the density or luminance changes (i.e., the line corresponds to the contour line of the region). A portion corresponding to the contour of the region is extracted on the basis of the amount of change and the direction of change of the density or the luminance. However, in cases in which the contour line of the region to be extracted is interrupted (non-continuous) or in cases in which a region-part whose outer edge configuration is substantially uniform is extracted from a region whose contour configuration is unclear or complex, it is difficult to appropriately extract the region even if the above-described methods are used.

Therefore, in the method of extracting a specific region of the sixth aspect, in the extraction of a specific region of an image, a search condition, for searching for a portion corresponding to the outer edge of the specific region on the basis of a predetermined image characteristic amount, is set in accordance with a characteristic of the specific region. A portion assumed to correspond to the outer edge of the specific region is searched for. After a searched portion is set as the reference point, a portion, which satisfies the search condition and which exists within a predetermined range within the image which range is based on the reference point, is searched for. In a case in which a portion satisfying the search condition is detected, setting of a detected portion as the next reference point is repeated. A line, which is formed by connecting the plurality of portions in the image which were set as reference points in order, is extracted as a line expressing the outer edge of the specific region.

In the sixth aspect, the search condition, for searching for a portion corresponding to the outer edge of the specific region on the basis of a predetermined image characteristic amount, is set in accordance with a characteristic of the specific region to be extracted from the image (e.g., the configuration of the outer edge of the specific region or another image characteristic amount). The search condition may be, as in the ninth aspect for example, a search condition for searching for a portion corresponding to the outer edge of the specific region to be extracted on the basis of any of the amount of change in density or luminance, the direction of change of the density or luminance, the density value or the luminance value, or the hue, at each portion (which may be a pixel, which is the smallest unit forming the image, or may be a block formed from a plurality of pixels, or the like).

For example, in a case in which a region, whose contour line which is within the image and has a large change in density or luminance is the outer edge, is extracted as the specific region, a search condition for searching for a portion corresponding to the outer edge of the specific region on the basis of the amount of change in and the direction of change of the density or luminance of each pixel in the image can be used. Further, for example, in a case in which a region, whose contour line within the image is the outer edge, is extracted as the specific region but the change in density or luminance at the contour line is relatively small, a search condition for searching for a portion corresponding to the outer edge of the specific region on the basis of the amount of change in and direction of change of the density or luminance value at a block unit formed from a plurality of pixels can be used. As another example, in a case in which a region formed from a group of portions whose densities or luminances are within a predetermined range is extracted as the specific region, or a region formed from a group of portions of a predetermined hue is extracted as the specific region, a search condition for searching for a portion corresponding to the outer edge of the specific region on the basis of the density value or the luminance value or the hue at each portion in the image can be used.

In the sixth aspect, a portion assumed to correspond to the outer edge of the specific region is searched for, and a searched portion is set as the reference point. Thereafter, a portion, which satisfies the search condition and which exists within a predetermined range of the image which range is based on the reference point, is searched for. In a case in which portions satisfying the search condition are detected, setting of the detected portions as the next reference points is repeated. Accordingly, the search range is smaller than in conventional methods, and the portion which is to be set as the next reference point can be searched for in a short time. Further, because only portions satisfying the search condition are searched for, only those portions which have a high probability of being the outer edge of the specific region to be extracted are searched for. The probability that a portion set as a reference point is a portion corresponding to the outer edge of the specific region increases.

In a case in which no portion satisfying the search condition is detected, it is deemed that there are no portions ahead of the currently set reference point which correspond to the outer edge of the region to be extracted, and searching can be interrupted. In this way, the portions assumed to correspond to the outer edge of the specific region can be detected at high speed. Further, a line, which is formed by connecting the plurality of portions in the image which were set as reference points in order, is extracted as a line expressing the outer edge of the specific region. Therefore, in the same way as in the first aspect, a specific region in an image can be extracted quickly.

In the seventh aspect, a plurality of characteristic points on the outer edge of the specific region to be extracted are determined. A search condition, for searching for portions corresponding to the outer edge of the specific region at a section between characteristic points thereof, is set for each section between characteristic points, in accordance with the characteristic of the part of the specific region which part corresponds to the section between the characteristic points. Each time a reference point is set, a judgment is made as to whether the set reference point corresponds to one of the plurality of characteristic points or to one of the sections between the plurality of characteristic points. Each time a set reference point is judged to correspond to one of the characteristic points, a search condition, for searching for a portion corresponding to the outer edge between the characteristic point corresponding to the set reference point and the next reference point on the outer edge of the specific region, is set as the search condition to be used in the search.

In the seventh aspect, portions, which correspond to the sections between the plurality of set characteristic points on the outer edge of the specific region, are searched for by using the corresponding search condition among the search conditions which are set for the respective sections between the characteristic points in accordance with the characteristic of the parts corresponding to the sections between the respective characteristic points (i.e., parts of the specific region). Therefore, if a fixed search condition is used due to, for example, the characteristic of the specific region to be extracted varying greatly in places (e.g., the configuration of the outer edge being complex), the specific region in the image can be reliably extracted in accordance with the seventh aspect even if detection of portions corresponding to the outer edge at the range of one part of the entire outer edge of the specific region is difficult.

In the eighth aspect, in the sixth or the seventh aspect, a plurality of types of search conditions, for searching for portions corresponding to the outer edge of the specific region on the basis of respectively different image characteristic amounts, are set as the search condition. Further, a priority is determined for each of the search conditions. In a case in which no portion satisfying the search condition having the highest priority is detected, a portion satisfying the search condition having the next highest priority is searched for. In a case in which a portion satisfying the search condition having this next highest priority is detected, the detected portion is set as the next reference point.

In the eighth aspect, a plurality of types of search conditions for searching on the basis of respectively different image characteristic amounts are set. A priority is determined for each search condition. In a case in which no portion satisfying the search condition having the highest priority is detected, a portion satisfying the search condition having the next highest priority is searched for. If a portion satisfying this next highest priority is detected, the detected portion is set as the next reference point.

For example, detection of a portion corresponding to the outer edge in the range of a part of the entire outer edge of the specific region may be difficult in a search based on a single image characteristic amount, due to the characteristic of the specific region to be extracted differing greatly in parts or the like. Even in such cases, in accordance with the eighth aspect, because a search based on another image characteristic amount is also carried out, searching for portions corresponding to the outer edge of the specific region can be carried out continuously, and the specific region to be extracted from the image can be extracted reliably.

In the method of determining copy conditions relating to the tenth aspect, a first search condition corresponding to a characteristic of a region corresponding to a person's face is used as the search condition. A line expressing the outer edge of a region is extracted from the image in accordance with the method of extracting a specific region of one of the sixth through the ninth aspects. A judgment is made as to whether the region in the image, which region is demarcated by the extracted line, is a region corresponding to a person's face. Copy conditions for copying the image onto a copy material are determined on the basis of an image characteristic amount in the region judged to be a region corresponding to a person's face.

In the tenth aspect, a first search condition, which corresponds to a characteristic of a region corresponding to a person's face, is used to extract a line, which expresses the outer edge of a specific region assumed to correspond to a person's face, by the method of extracting a specific region of one of the sixth through the ninth aspects. Therefore, as described above, the outer edge of a specific region assumed to correspond to a person's face can be extracted quickly. Further, in the tenth aspect, a judgment is made as to whether a region within the image, which region is enclosed by the extracted line, is a region corresponding to a person's face. Therefore, in the same way as in the fourth aspect, a region corresponding to a person's face can be extracted accurately. Further, copy conditions for copying the image onto a copy material are determined on the basis of an image characteristic amount in the region judged to be a region corresponding to a person's face. Therefore, copy conditions for appropriately printing a region corresponding to a person's face can be obtained in a short time.

In the eleventh aspect, a second search condition corresponding to a characteristic of a region which is different than a region corresponding to a person's face is used as the search condition. A line which expresses the outer edge of the region is extracted from the image by a method of extracting a specific region of one of the sixth through ninth aspects. A judgment is made as to whether the region corresponds to a person's face by also taking into consideration the arrangement of the line extracted by using the second search condition.

In the eleventh aspect, a search is carried out by using a second search condition corresponding to a characteristic of a region different than a region corresponding to a person's face. Therefore, on the basis of the arrangement of the line extracted as described above, it can easily be determined whether a line, which is extracted in accordance with the tenth aspect and which is assumed to represent the outer edge of a region corresponding to a person's face, is a line which has been extracted erroneously. In the same way as in the fifth aspect, the accuracy in extracting a region corresponding to a person's face is improved even more, and it is even more probable that copy conditions for appropriately printing a region corresponding to a person's face are obtained.

BRIEF DESCRIPTION OF THE DRAWINGS

FIG. 2 is a flowchart for explaining photographic printing processing relating to the embodiment.

FIG. 5A is a conceptual view for explaining searching for a tracing starting point.

FIG. 5B is a conceptual view for explaining tracing of an edge from a tracing starting point.

FIG. 5C is a conceptual view for explaining determination of a contour of a face candidate region.

FIG. 5D is a conceptual view for explaining setting of a face candidate region.

FIG. 7A is an image diagram for conceptually explaining the flow of edge tracing processing.

FIG. 7B is an image diagram for conceptually explaining the flow of edge tracing processing.

FIG. 7C is an image diagram for conceptually explaining the flow of edge tracing processing.

FIG. 7D is an image diagram for conceptually explaining the flow of edge tracing processing.

FIG. 7E is an image diagram for conceptually explaining the flow of edge tracing processing.

FIG. 7F is an image diagram for conceptually explaining the flow of edge tracing processing.

FIG. 9A is an image diagram for explaining that resolution at which a human region can be appropriately extracted differs in accordance with the size of the human region in the image.

FIG. 9B is an image diagram for explaining that resolution at which a human region can be appropriately extracted differs in accordance with the size of the human region in the image.

FIG. 9C is an image diagram for explaining that resolution at which a human region can be appropriately extracted differs in accordance with the size of the human region in the image.

FIG. 9D is an image diagram for explaining that resolution at which a human region can be appropriately extracted differs in accordance with the size of the human region in the image.

FIG. 13 is a flowchart for explaining yet another example of photographic printing processing relating to the embodiment.

FIG. 14A is a conceptual view for explaining a search range for an edge in a case in which the range of the search distance is changed rather than the resolution being converted.

FIG. 14B is a conceptual view for explaining a search range for an edge in a case in which the range of the search distance is changed rather than the resolution being converted.

FIG. 14C is a conceptual view for explaining a search range for an edge in a case in which the range of the search distance is changed rather than the resolution being converted.

FIG. 18A is a conceptual view for explaining searching based on changes in density in a block unit.

FIG. 18B is a conceptual view for explaining searching based on changes in density in a block unit.

FIG. 18C is an image diagram illustrating, in the extraction of a contour line from an original image, an example of a range to which a search condition for carrying out searching on the basis of an edge is applied, and a range to which a search condition for carrying out searching on the basis of changes in density in a block unit is applied.

FIG. 20 is a conceptual view for explaining characteristic points and modes of a third embodiment.

FIGS. 21A and 21B are flowcharts for explaining outer edge tracing processing of a third embodiment.

DESCRIPTION OF THE PREFERRED EMBODIMENTS

Hereinafter, examples of embodiments of the present invention will be described in detail with reference to the accompanying drawings.

[First Embodiment]

Figure 1:
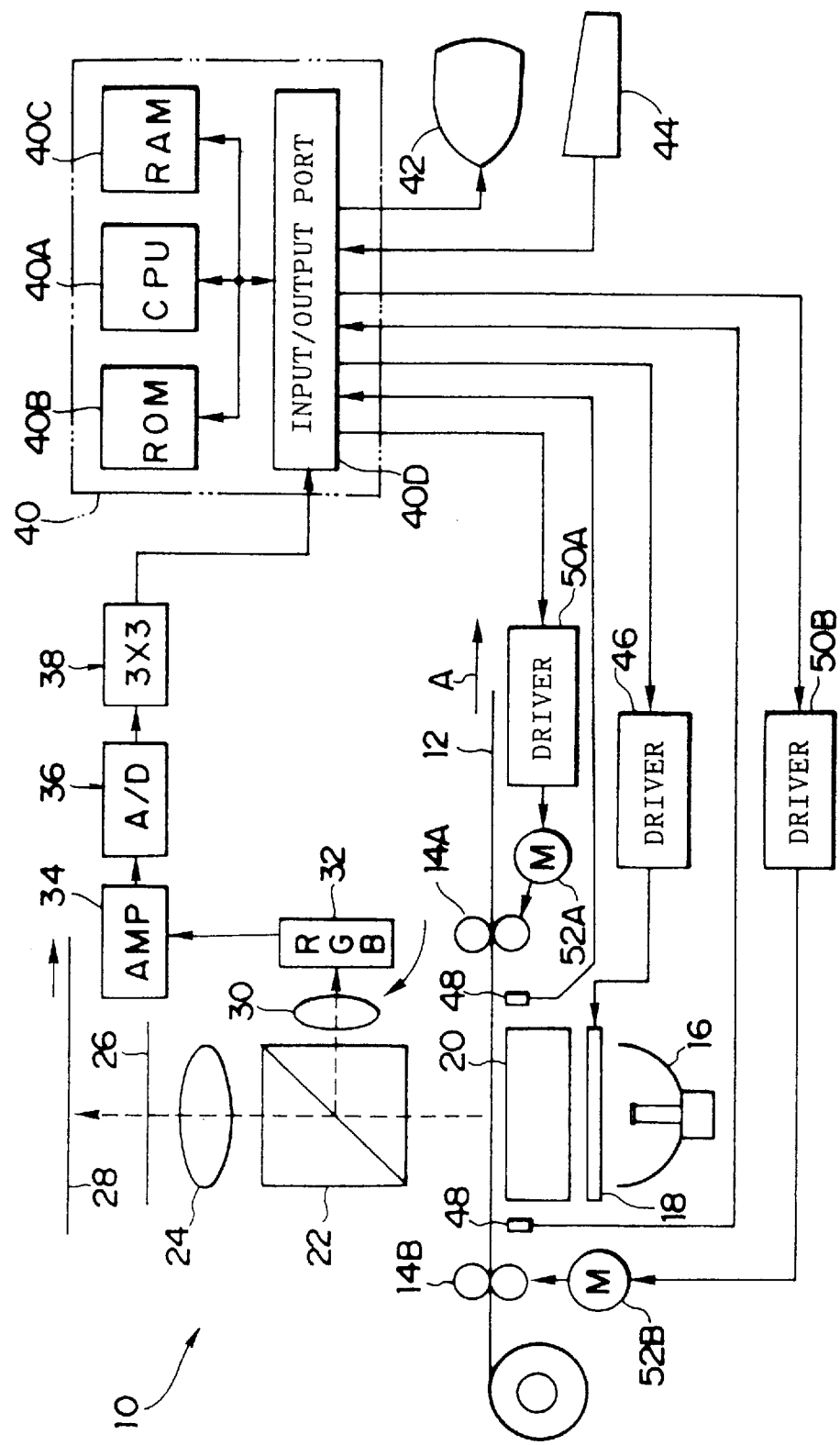
FIG. 1 is a schematic structural view of a photographic printing apparatus relating to an embodiment of the present invention.

A photographic printing apparatus 10 to which the present invention can be applied is illustrated in FIG. 1. The photographic printing apparatus includes a light source 16 which emits exposure light for printing an image recorded on a negative film 12. A color correction filter 18 such as a light adjusting filter or the like, a diffusion box 20 and a prism 22 for distribution are disposed in that order at the side of the light source 16 at which light is emitted.

A conveying path for the negative film 12 which serves as a photographic film is formed between the diffusion box 20 and the prism 22 for distribution. The prism 22 for distribution distributes in two directions the light which has passed through the negative film 12. Conveying roller pairs 14A, 14B are provided along the conveying path of the negative film 12 at either side of the optical axis of the light source 16. The conveying roller pairs 14A, 14B are connected to the drive shafts of motors 52A, 52B, respectively, and are rotated by the drive force of the motors 52A, 52B transmitted thereto so as to convey the negative film 12.

A projecting optical system 24, a black shutter 26 and a color paper (photographic printing paper) 28 serving as a copy material are disposed In that order on the optical path of one of the lights distributed in two directions by the prism 22 for distribution. A projecting optical system 30 and a CCD image sensor 32 are disposed in that order on the other optical path. The CCD image sensor 32 divides an entire image (one frame) recorded on the negative film 12 into a plurality of pixels (e.g., 256×256 pixels), divides each pixel into three colors of R (red), G (green) and B (blue), and effects photometry.

An amplifier 34, which amplifies signals outputted from the CCD image sensor 32, an analog-digital (A/D) converter 36, and a 3×3 matrix circuit 38 for correcting the sensitivity of the CCD image sensor 32 are connected in that order to the signal output end of the CCD image sensor 32. The 3×3 matrix circuit 38 is connected to an input/output port 40D of a control section 40 which is formed by a microcomputer and peripheral devices thereof. The control section 40 includes a CPU 40A, a ROM 40B, a RAM 40C and the input/output port 40D which are connected to one another via buses.

The color correction filter 18 is connected to the input/output port 40D of the control section 40 via a driver 46 which drives the color correction filter 18. The motors 52A, 52B are respectively connected to the input/output port 40D via drivers 50A, 50B. A display 42, a keyboard 44 and image surface detecting sensors 48 are also connected to the input/output port 40D. The display 42 serves as a displaying means and is formed by an LCD or a CRT. The keyboard 44, such as a ten key or the like, is used for an operator to input various types of information. The image surface detecting sensors 48 are disposed at either side of the optical axis of the light source 16, and detect the amount of light transmitted through the negative film 12.

Next, operation of the first embodiment will be described with reference to the flowchart of FIG. 2. The flowchart of FIG. 2 is implemented each time the negative film 12 set at the photographic printing apparatus 10 is conveyed in a predetermined direction and output signals from the image surface detecting sensors 48 are observed and an image recorded on the negative film 12 is positioned at an exposure position.

Figure 4:
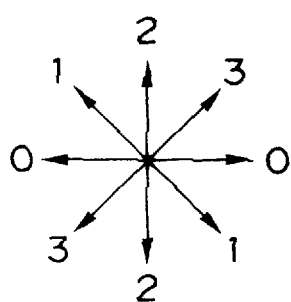
FIG. 4 is a conceptual view illustrating an example of differential filters for detecting edges.

In step 100, the image positioned at the exposure position is photometrically measured by the CCD image sensor 32. The image data for each of R, G, B of a fixed resolution which image data is outputted from the CCD image sensor 32 via the amplifier 34, the A/D converter 36, and the 3×3 matrix circuit 38 is fetched, and the fetched image data is temporarily stored in a memory such as the RAM 40C or the like. In step 102, the image data stored in the memory is fetched, and for each pixel, the values of the change in density (edge intensities) along the directions toward the eight pixels existing at the periphery of a pixel (the "eight adjacent pixels") (i.e., a total of eight directions which are illustrated in FIG. 4 by the eight arrows whose directions respectively differ by 45 degrees) are computed by using differential filters such as Sobel filters or the like. An example of eight differential filters which compute the edge intensities along the eight directions respectively is illustrated in FIG. 4.

For example, in a case in which the edge intensity along a predetermined direction is to be computed, by using the differential filter indicated by the arrow pointing in the predetermined direction among the eight arrows illustrated in FIG. 4, the edge intensity along the predetermined direction can be determined by multiplying the density value of the pixel which is the object of computation and the density values of the eight pixels existing at the periphery of the pixel which is the object of computation respectively by the number of the differential filter which serves as a coefficient, and then computing the sum of these products. By carrying out the above-described computation by using the eight differential filters corresponding to the respective directions, edge intensities along each direction for a single pixel can be determined.

The edge intensities, determined as described above, are values in which the edge intensities along the respective directions of the periphery of the pixel are quantized in eight direction components. The number of the direction components for computing the edge intensities is not limited to eight, and may be a large number (e.g., 16 direction components). However, as the number of direction components increases, the algorithm becomes more complex, and processing requires more time. Further, if the number of direction components is small (e.g., 4 direction components), the algorithm becomes more simple, but the accuracy in extracting a contour line, as will be described later, deteriorates.

In step 102, for each pixel, the edge intensities along the respective directions are compared, and the maximum value of the absolute values of the edge intensities is stored as the edge intensity of the pixel which is the object of processing. Further, a direction orthogonal to the direction in which the absolute value of the edge intensity is the greatest (i.e., if the pixel which is the object of processing exists on a contour line of a region, the direction in which the contour line extends) is stored as the edge direction of the pixel. In the first embodiment, for the edge directions, directions which differ from each other by 180 degrees among the eight directions illustrated in FIG. 4 are considered to be the same direction, and the directions are differentiated by the numbers 0 through 3 being applied thereto. For example, if the direction in which the absolute value of the edge intensity is the greatest is the direction illustrated by number 1 in FIG. 4, information expressing the direction orthogonal to this direction is stored as the edge direction (i.e., number 3 in FIG. 4 is stored as the edge direction). Due to the above-described processing, an edge intensity and an edge direction of each pixel is stored in the memory as edge data.

In subsequent step 104, edge tracing processing for extracting the contour of a person (a human contour) is carried out. This edge tracing processing will be described with reference to the flowcharts in FIGS. 3A and 3B. In step 130, an edge which will serve as a tracing starting point is searched for on the basis of the edge data stored in the memory in previous step 102. This searching is carried out by scanning the edge data of each pixel in the raster direction as illustrated by the broken line arrows in FIG. 5A, and repeatedly determining whether a pixel (an edge) has an edge intensity of a predetermined value or greater. When an edge having an edge intensity of a predetermined value or greater is detected, the search is stopped, and the routine proceeds to step 132 where the detected edge is set as the tracing starting point and stored in the memory.

In step 133, among the two directions corresponding to the edge direction of the edge which was set as the tracing starting point, one direction is selected as the edge tracing direction. For example, in a case in which the edge direction is the direction illustrated by number 0 in FIG. 4, one of the two direction components constituting this edge direction, i.e., either the direction oriented toward the right side of the image or the direction oriented toward the left side of the image, is selected as the edge tracing direction.

Figure 6A:
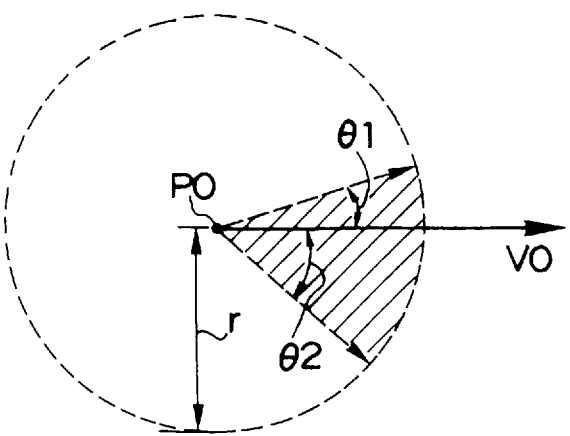
FIG. 6A is a conceptual view for explaining a search range for an edge in edge tracing processing for extracting a human contour.

In step 134, the tracing starting point is made a reference point, and a search range for searching for an edge to be used as the next reference point is set. As illustrated in FIG. 6A, the search range is defined as being within a circle whose center is reference point P0 and whose radius is a search distance r, and within an angle range of an angle $\theta 1$ in the counterclockwise direction and an angle $\theta 2$ in the clockwise direction, based on the edge direction V0 (the edge tracing direction set in step 133) at the reference point P0. The search distance r and the angles $\theta 1$, $\theta 2$ are variables. In step 134, values of a search distance r and angles $\theta 1$, $\theta 2$ which values were set in advance for extracting a human contour are fetched. A pixel whose center is positioned within the search range is determined to be a pixel within the search range.

Figure 6B:
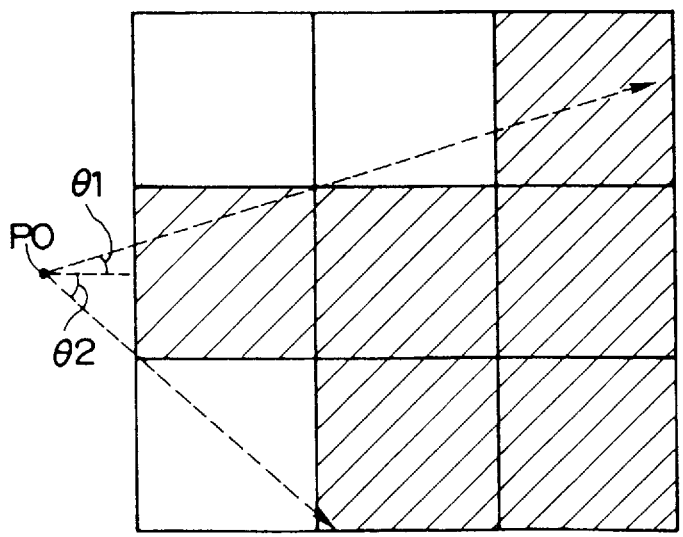
FIG. 6B is an image diagram illustrating pixels existing in the search range which is illustrated as an example in FIG. 6A.

As one example, pixels, which are determined to be pixels within the search range in a case in which the angles $\theta 1$, $\theta 2$ are the angles illustrated in FIG. 6A, are illustrated by the hatching in FIG. 6B. In the edge tracing processing for extracting a human contour, in a case in which the edge direction (the edge tracing direction) at the tracing starting point is a direction oriented toward the right side of the image, the values of the angles $\theta 1$, $\theta 2$ are set such that only a rounded contour line which extends clockwise while curving to the right at a degree of curvature of a predetermined value or less from the tracing starting point is extracted (e.g., angle $\theta 1=0$ degrees, angle $\theta 2=45$ degrees). In a case in which the edge direction (the edge tracing direction) at the tracing starting point is a direction oriented toward the left side of the image, the values of the angles $\theta 1$, $\theta 2$ are set such that only a rounded contour line which extends counterclockwise while curving to the left at a degree of curvature of a predetermined value or less from the tracing starting point is extracted (e.g., angle $\theta 1=45$ degrees, angle $\theta 2=0$ degrees). As an example, pixels which are determined to be pixels within the search range in a case in which angle $\theta 1=0$ degrees and angle $\theta 2=45$ degrees are illustrated by the hatching in FIG. 7A.

In step 136, a search edge direction pattern (corresponding to the search direction pattern of the present invention) for each pixel within the search range is set on the basis of the edge direction (V0) of the pixel which is the reference point. The search edge direction pattern is a pattern for determining whether the edge direction of a pixel within the search range coincides with the edge direction (the edge tracing direction) V0 of the pixel which is the reference point. The search edge direction pattern is obtained by setting, as the search edge direction, the edge direction within the angle range (V0+$\phi$ij1) to (V0+$\phi$ij2) with respect to each pixel Pij, wherein each pixel within the search range is Pij.

In the edge tracing processing for extracting a human contour, the angle deviations $\phi ij1$, $\phi ij2$ as well are set similarly to the angles $\theta 1$, $\theta 2$ such that, in a case in which the edge direction (edge tracing direction) at the tracing starting point is a direction oriented toward the right side of the image, only the edge direction of an edge, which corresponds to a rounded contour line which extends in a clockwise direction while curving to the right at a degree of curvature of a predetermined value or less from the tracing starting point, coincides with the search edge direction, whereas in a case in which the edge direction (edge tracing direction) at the tracing starting point is a direction oriented toward the left side of the image, only the edge direction of an edge, which corresponds to a rounded contour line which extends in the counterclockwise direction while curving toward the left at a degree of curvature of a predetermined value or less from the tracing starting point, coincides with the search edge direction. As an example, illustrated in FIG. 7B is the search edge direction pattern in a case in which the search edge direction is set with $\phi ij1=0$ degrees, $\phi ij2=45$ degrees for each pixel within the search range illustrated in FIG. 7A.

In subsequent step 138, edge data (the edge direction and edge intensity) of each pixel within the search range is fetched, and pixels (edges), whose edge direction coincides with the search edge direction pattern set as described above and whose edge intensity is greater than or equal to a lower limit value, are searched for. In this search, it is hypothesized that the currently-set reference point is a point positioned on a contour line corresponding to a human contour. Further, only a search region in which it is assumed that the next point positioned on the contour line is positioned is searched. Therefore, searching processing is completed in a short time.

In step 140, on the basis of the search of step 138, a determination is made as to whether there is an edge corresponding to the above-described search condition. If the determination is affirmative, the routine proceeds to step 142 where a determination is made as to whether a plurality of such edges have been detected. If the determination in step 142 is negative, this is a case in which a single edge has been detected as an edge corresponding to the search condition. Therefore, the routine proceeds to step 144 where the detected edge is set as the reference point and stored in the memory. Thereafter, the routine proceeds to step 150.

If the answer to the determination in step 142 is affirmative, in step 146, from among the plurality of edges detected as edges corresponding to the search condition, a single edge is selected as the next reference point in accordance with a predetermined standard. The predetermined standard may be, for example, the edge intensity. As an example, among the pixels (edges) within the search range illustrated in FIG. 7A, if the edges having an edge direction coinciding with the edge direction pattern are the three pixels illustrated by the hatching in FIG. 7C (the edge intensity of each pixel is denoted by the numbers in FIG. 7C), the edge whose edge intensity is the greatest among these three pixels is selected (i.e., the edge whose edge intensity is 15 in FIG. 7; refer to FIG. 7D). Note that the above-described processing corresponds to the invention of the second aspect. In subsequent step 148, the selected edge is set as the reference point and is stored in the memory. Thereafter, the routine proceeds to step 150.

In step 150, a determination is made as to whether the reference point set as described above coincides with the tracing starting point set in previous step 132. If the determination is negative, the routine returns to step 134, and the above-described processings are carried out again as illustrated in FIGS. 7E, 7F. These processings are repeated until the determination in step 140 is negative or the determination in step 150 is affirmative.

The continuous row of edges, which were set as reference points in the above-described processings, is treated as a contour line in processing steps which will be described later. As described above, in the edge tracing processing for extracting a human contour, the values of the angles $\theta 1$, $\theta 2$ and the angle deviations $\phi ij1$, $\phi ij2$ are set as parameters of the search condition such that only an edge, which corresponds to a rounded contour line which extends while curving at a degree of curvature of a predetermined value or less from the tracing starting point, is extracted. In a case in which no edge matching the search condition determined by the above parameters is detected, the determination in step 140 is negative. Therefore, by the above processings, only a rounded contour line which curves gradually at a degree of bending of a predetermined value or less, i.e., only a contour line which is assumed to correspond to a human contour, is extracted.

If the determination in step 140 is negative, the routine proceeds to step 152 where a determination is made as to whether tracing has been effected along both of the two directions corresponding to the edge direction of the tracing starting point which is currently set, i.e., whether tracing of both of the two directions as edge tracing directions has been carried out. If the answer to the determination in step 152 is negative, the routine proceeds to step 154 where the currently set tracing starting point is reset as a reference point and the direction in which tracing has not yet been carried out among the two directions is set as the edge tracing direction. Thereafter, the routine returns to step 134. In this way, edge tracing is carried out with the two directions corresponding to the edge direction at the tracing starting point being edge tracing directions, as illustrated by tracing starting point A and tracing starting point B in FIG. 5B.

If the determination in step 152 is affirmative or if the determination in step 150 is affirmative because the edge set as the reference point coincides with the tracing starting point (i.e., if points positioned on the contour of a closed region within the image can be detected as reference points along the entire periphery of the closed region), tracing processing of an edge corresponding to a single contour line is completed, and the routine proceeds to step 155. If the number of reference points set by the above processings is a predetermined number or greater, a line, which is formed by the respective reference points being connected in the order in which they were set, is registered as a contour line expressing a human contour.

In subsequent step 156, an edge to be used as the new tracing starting point is searched for in the same way as in previous step 152. In step 158, a determination is made as to whether such an edge has been detected. If the determination in step 158 is affirmative, the routine returns to step 132, and edge tracing processing is carried out with the newly detected edge as the tracing starting point. If the determination in step 158 is negative, the above-described edge tracing processing for extracting a human contour is completed, and processing moves on to step 106 of the flowchart in FIG. 2.

In step 106, contours of face candidate regions which are assumed to correspond to persons' faces are judged from among the plurality of contour lines which were extracted by the above-described edge tracing processing for extracting a human contour. This judgment corresponds to the judgment in the fourth aspect as to whether a region corresponds to a person's face. This judgment can be made on the basis of a characteristic amount expressing the configuration of the contour line such as, for example, the aspect ratio (L2/L1 in FIG. 5C) or the number of direction components forming the contour line as illustrated as an example in FIG. 5C. For example, a contour configuration of a region assumed to correspond to a person's face is generally a circle or an ellipse having an aspect ratio within a predetermined range. Therefore, a contour line, which is formed from a predetermined number or more direction components (e.g., 5 or more) and whose aspect ratio falls within a predetermined range (e.g., contour line A in FIG. 5C), can be judged to be the contour of a region assumed to correspond to a person's face. Contour lines having a number of direction components less than a predetermined number and contour lines whose aspect ratio falls outside of a predetermined range (e.g., contour line B in FIG. 5C) are judged to not be contours of face candidate regions.

Figure 8A:
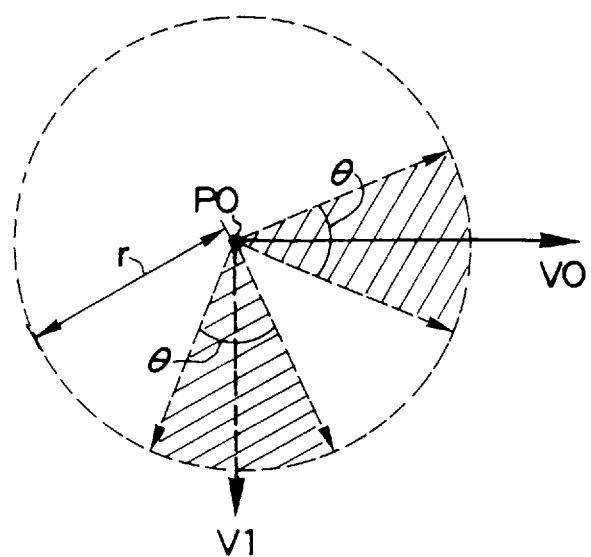
FIG. 8A is a conceptual view for explaining a search range for an edge in edge tracing processing for extracting a non-human contour.
Figure 8B:
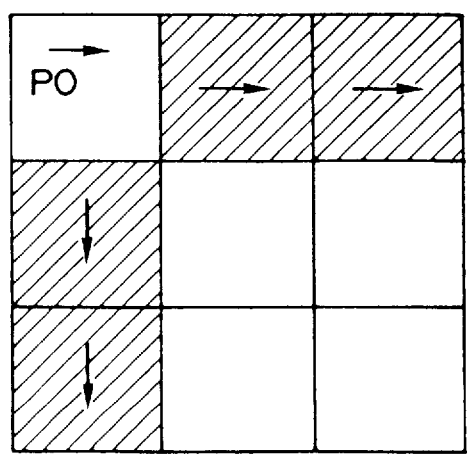
FIG. 8B is an image diagram illustrating pixels existing in the search range illustrated in FIG. 8A.

In subsequent step 108, edge tracing processing for extracting a contour of a region which is not a human region (a "non-human region") is carried out. Edge tracing processing for extracting a contour of a non-human region corresponds to the extraction of a contour line in the fifth aspect. This edge tracing processing is almost the same as the previously-described edge tracing processing for extracting a human contour (see FIG. 3). However, as illustrated in FIG. 8A, in the edge tracing processing for extracting a contour of a non-human region, the definition of the search range for searching for an edge which is to be the next reference point is different. The search range is within a circle whose center is the reference point P0 and whose radius is the search distance r, and is within a range of an angle θ whose center is the edge direction (edge tracing direction) V0 at the reference point P0, and within a range of an angle θ whose center is the direction V1 which is orthogonal to the edge direction V0 (i.e., the search range is within the ranges illustrated by the hatching in FIG. 8A). Pixels which are determined to be pixels within the above-described search range are illustrated by the hatching in FIG. 8B.

By setting the search range as described above, only a contour line which continues substantially linearly or a contour line which is bent substantially orthogonally at a predetermined portion, i.e., only a contour line having a high probability of not being a human contour line (e.g., a contour line having a high probability of being a contour line of a man-made object such as a window, furniture or the like) is extracted. This processing corresponds to the processing in the fifth aspect for extracting a contour line expressing the contour of a predetermined region.

In subsequent step 110, contour lines, for which there is the possibility that they are not contour lines of regions corresponding to persons' faces, are, on the basis of the results of processing in step 108, excluded from the contour lines which were judged in step 106 to have a high probability of being contour lines of face candidate regions. Further, contour lines of regions having a high probability of being regions corresponding to persons' faces (face regions) are judged. This judgment corresponds to the judgment of the fourth and fifth aspects as to whether a region is a region corresponding to a person's face.

This judgment can be made on the basis of whether the contour lines determined to be contour lines of face candidate regions in step 106 for example intersect the contour lines of non-human regions extracted in step 108. In a case in which a contour line intersects the contour line of a non-human region, that contour line is judged to have a high probability of not being a contour line of a region corresponding to a person's face, and accordingly is excluded. Further, in step 110, on the basis of the contour line or contour lines which were riot excluded by the above judgment, a circuLar or elliptical region surrounded by the contour line or a rectangular region circumscribed by the contour line is set as a face region as illustrated in, for example, FIG. 5D.

In step 112, a determination is made as to whether the processings in steps 102 through 110 have been carried out a predetermined number of times. If the answer to this determination is negative, the routine proceeds to step 114 where, for the image data fetched and stored in step 100, the resolution of the pixel data is converted (the resolution is lowered) either by data of the respective pixels being thinned out at predetermined intervals, or by, for each block of pixels formed by m×n pixels, setting as the representative value of the block the average density or the average color of the respective pixels forming the block. Thereafter, the process returns to step 102. In this way, until the determination in step 112 is affirmative, the processings of steps 102 through 110 (edge detection, edge tracing, face region judgment, and the like) are repeated while the resolution of the pixel data is lowered each time.

The processing steps such as edge tracing, face region judgment and the like are repeated while the resolution of the image data is changed each time as described above because the appropriate resolution for extracting a human contour differs in accordance with the size of the region corresponding to a person within the image.

More specifically, in a case in which the size of a region corresponding to a person is large, if the resolution is coarse as illustrated in FIG. 9A, a rounded contour line can be extracted in the edge tracing processing for extracting a contour line of a person. However, if the resolution is fine as shown in FIG. 9C, there are slight fluctuations such as convex and concave portions in a contour line which roughly is of a rounded configuration, and the contour line of a person cannot be properly extracted due to the effect of these fluctuations. Further, in a case in which the size of a region corresponding to a person is small, if the resolution is fine as illustrated in FIG. 9D, a rounded contour line can be extracted. However, if the resolution is coarse as shown in FIG. 9B, the pixel interval is too large in comparison with the size of the human region, and the contour line of a person cannot be properly extracted because the degree of bending of the contour line of the person on the image data is large in sections.

Accordingly, by repeating processings such as edge tracing and face region judgment while varying the resolution of the image data each time as described above, a region corresponding to a person's face can be reliably extracted regardless of the size of the region corresponding to the person in the image.

When the processings of steps 102 through 110 have been carried out a predetermined number of times and the determination in step 112 is affirmative, the routine proceeds to step 116 where final face region judgment is carried out to judge the region having the highest probability of being a region corresponding to a person's face. Final face region judgment may be carried out by determining, for each of the plurality of face candidate regions extracted by the above-described processing, the matchability of the face candidate region to a region corresponding to a person's face on the basis of whether a configuration pattern which is characteristic of a predetermined portion of a person exists at a position conforming to a positional relationship between the person's face and the predetermined portion, at a size and orientation corresponding to the face candidate region.

Figure 10A:
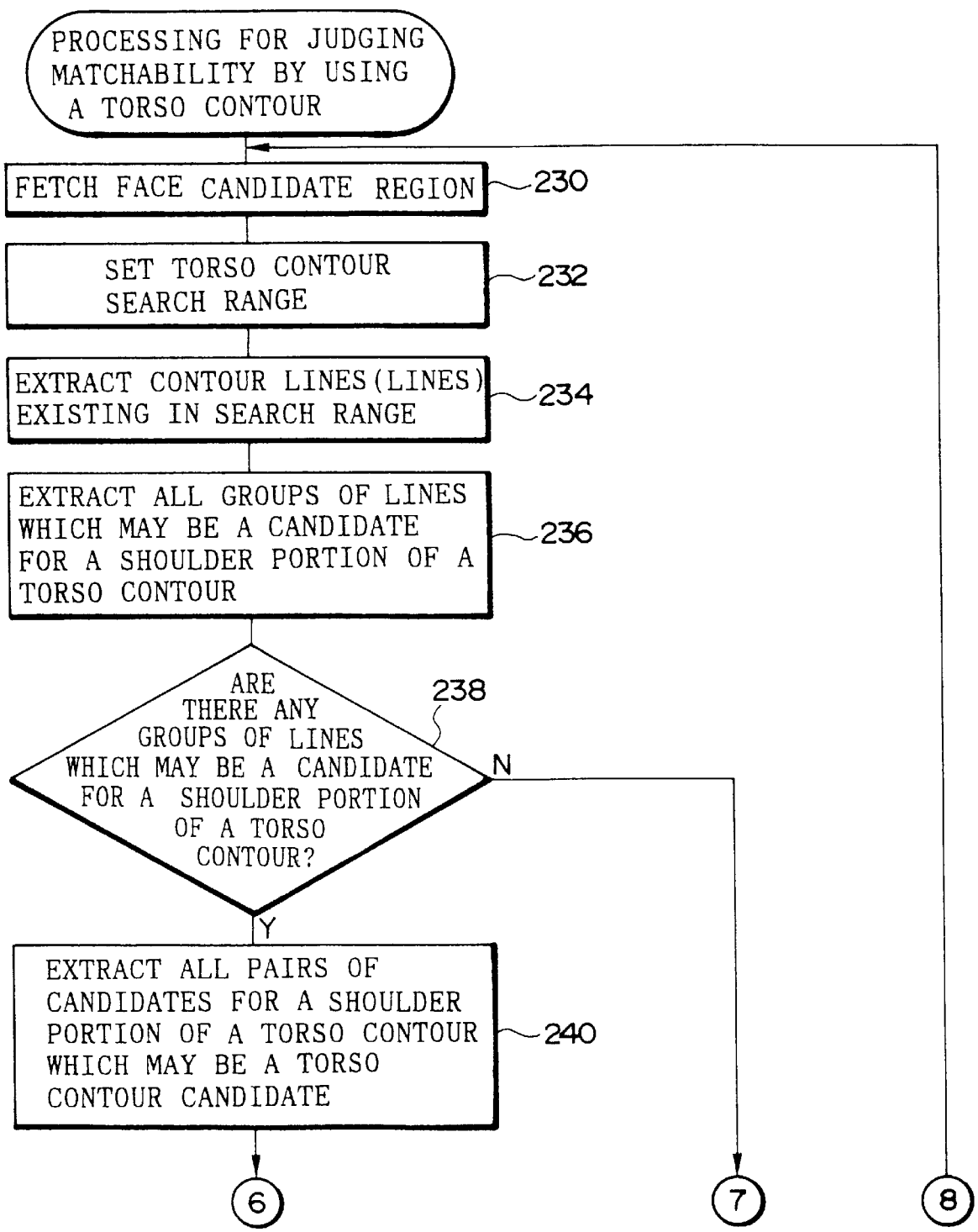
FIGS. 10A and 10B are flowcharts for explaining matchability determining processing for a torso contour.
Figure 10B:
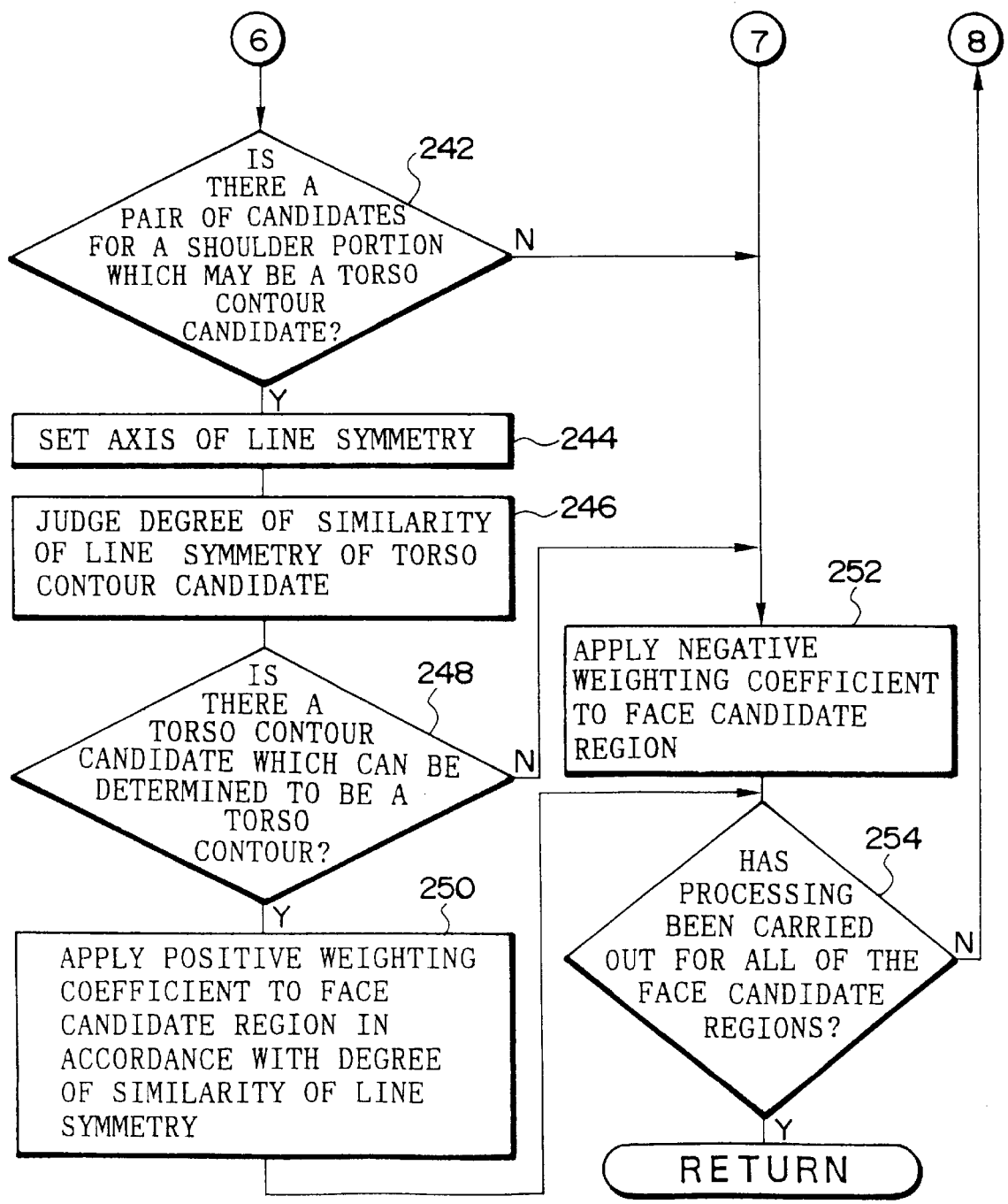

For example, a configuration pattern representing the contour of a person's head, a configuration pattern representing the contour of a person's torso, a configuration pattern representing the structure of the interior portion of a person's face, or the like can be used as the characteristic configuration pattern. Hereinafter, processing for judging the matchability of the respective face candidate regions on the basis of a configuration pattern representing the contour of a person's torso will be described as an example with reference to the flowcharts of FIGS. 10A and 10B.

In step 230, one of the face candidate regions is fetched. In step 232, a search range for a configuration pattern representing a torso contour is set in accordance with the size and the orientation of the fetched face candidate region as well as the positional relationship between the person's face and the contour of a torso. As an example, in a case in which the fetched face candidate region is the range encircled by the broken line in FIG. 11A, the range illustrated by the hatching in FIG. 11A, at which range it is assumed there exists a configuration pattern representing a torso contour (a contour which continues from the neck of the person to the shoulder and from the shoulder to an arm portion or a torso lower portion) for the face candidate region, is set as the search range.

In next step 234, lines (contour lines) which exist within the search range are extracted from the contour line which was extracted by the edge tracing processing for extracting a human contour. In this way, a plurality of lines, including the lines denoted by ⑤ through ⑧ in FIG. 11B for example, are extracted as lines existing within the search range ilLustrated in FIG. 11A.

Figure 11A:
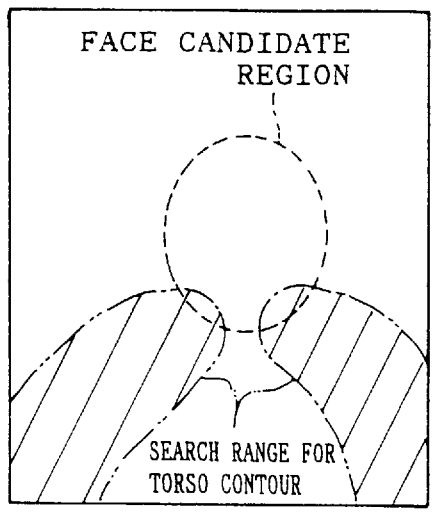
FIG. 11A is an image diagram for explaining setting of a search range for a torso contour, as a detail of the matchability determining processing for a torso contour.
Figure 11B:
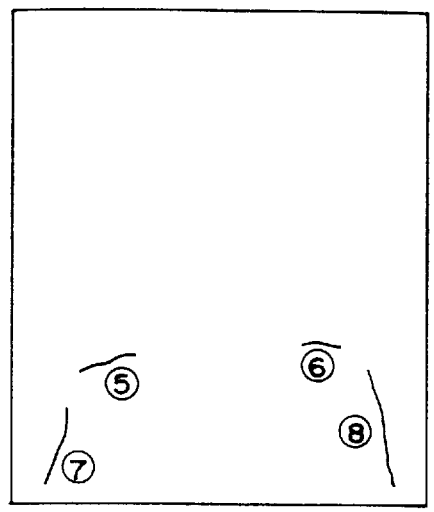
FIG. 11B is an image diagram for explaining extraction of contour lines existing in the search range, as a detail of the matchability determining processing for a torso contour.
Figure 11C:
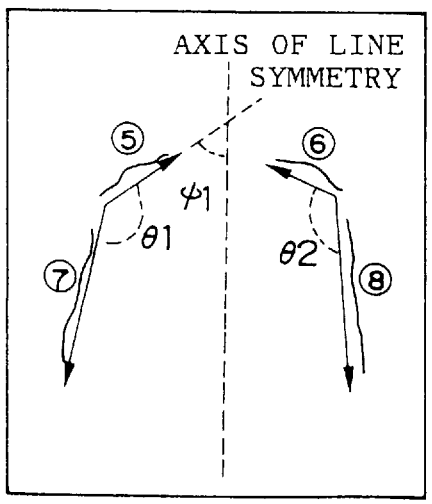
FIG. 11C is an image diagram for explaining determination of a degree of similarity of line symmetry, as a detail of the matchability determining processing for a torso contour.

In step 236, all of the groups of lines which could be candidates for a shoulder portion of a torso contour are extracted from the lines (contour lines) extracted in step 234. More specifically, a pair of lines, for which the distance between their end points is small and for which the angle at which the lines intersect each other falls within a predetermined range, is searched for. Groups of lines which satisfy these conditions are all extracted as groups of lines which may be candidates for a shoulder portion of a torso contour. For example, in a case in which the lines illustrated in FIG. 11B are extracted, as illustrated in FIG. 11C, the group of lines ⑤ and ⑦ and the group of lines ⑥ and ⑧, whose respective angles of intersection (θ1 and θ2) fall within a predetermined range, are extracted. For each extracted group of lines, the lines in each group are extended and connected so as to respectively form a candidate for a shoulder portion of the torso contour.

In step 238, a determination is made as to whether a group of lines which may become a candidate for a shoulder portion of a torso contour has been extracted. If the answer to the determination in step 238 is affirmative, the routine proceeds to step 240 where a search of the candidates for a shoulder portion of a torso contour formed as described above is conducted to find a pair of candidates for a shoulder portion of a torso contour whose concave portions oppose each other. All pairs of candidates for a shoulder portion of a torso contour which satisfy this condition are extracted as pairs of candidates for a shoulder portion of a torso contour which may be torso contour candidates. In the above description, a contour line of a configuration in which the group of lines ⑤ and ⑦ are connected in advance is also extracted.

In step 242, a determination is made as to whether there is a pair of candidates for a shoulder portion which may be a torso contour candidate. If the determination in step 242 is affirmative, the routine proceeds to step 244 where an axis of line symmetry is set as shown in FIG. 11C for each of the pairs of candidates for a shoulder portion of a torso contour (torso contour candidates) which were extracted in step 240. In subsequent step 246, the degree of similarity of the line symmetry of the torso contour candidate is judged. Further, it is judged whether the angles (e.g., φ1 in the case of line ⑤ in FIG. 11B) between the axis of line symmetry and the lines which are assumed to correspond to the contour from the neck to the shoulder of a person (e.g., the lines ⑤, ⑥ in FIG. 11B) fall within a predetermined range.

In step 248, the probability that each of the torso contour candidates is a line pair representing the contour of a person's torso is determined on the basis of the results of determination of the degree of similarity of the line symmetry. It is thereby determined if there is, among the respective torso contour candidates extracted in step 240, a torso contour candidate which can be determined to be a line pair corresponding to a torso contour. If the determination in step 248 is affirmative, the torso contour candidate determined to have the highest probability of being a line pair representing the contour of a person's torso is judged to be a line corresponding to the contour of a person's torso. In step 250, a weighting coefficient whose number is positive is applied to the face candidate region fetched in step 230. The weighting coefficient can be set, on the basis of the line pair (torso contour candidate) determined to have the highest probability of being a line pair expressing the contour of a person's torso, such that the value of the weighting coefficient increases as the degree of similarity of line symmetry of the torso contour candidate increases. When the processing of step 250 is executed, the routine proceeds to step 254.

If the determination in step 238 or in step 242 or in step 248 is negative, a line pair having a high probability of being a line pair representing the contour of a person's torso could not be detected for the face candidate region fetched in step 230. Therefore, in step 252, a weighting coefficient whose number is negative is applied to this face candidate region, and the routine proceeds to step 254.

In step 254, a determination is made as to whether the above-described processing has been carried out for all of the face candidate regions. If a plurality of face candidate regions have been set, the determination in step 254 is negative, and steps 230 through 254 are repeated until the answer to the determination in step 254 is affirmative. In this way, a weighting coefficient whose number is either positive or negative is applied to each of the face candidate regions in accordance with whether a line pair having a high probability of being a line pair expressing the contour of a person's torso was detected, and processing is completed. When the above-described processing is carried out as the final face region judgment of step 116, the face candidate region, to which the highest weighting coefficient was applied in the above-described processing, can be selected as the face candidate region having the highest probability of being a region corresponding to a person's face (i.e., the face region).

In subsequent step 118, exposure amounts Ej are computed on the basis of the image data of the face region determined as in the above explanation and on the basis of the average density Dj of the entire image surface of the image. The exposure amounts Ej can be computed by following formula (1):

$$\log E_j = LM_j \cdot CS_j \cdot (DN_j - D_j) + PB_j + LB_j + MB_j + NB_j + K_1 + K_2 \quad (1)$$

wherein the respective symbols are as follows.

LM: Magnification slope coefficient. Set in advance in accordance with the enlargement magnification which is determined by the type of the negative film and by the print size.

CS: Color slope coefficient. Set in advance per type of negative film. There exist color slope coefficients for underexposure and those for overexposure. A determination is made as to whether the average density of an image frame to be printed is under or over a reference negative density value, and one of a color slope coefficient for underexposure and a color slope coefficient for overexposure is selected.

DN: Reference negative density value.

D: Density value of image frame to be printed.

PB: Correction balance value for standard color paper. Determined in accordance with type of color paper.

LB: Correction balance value for standard printing lens. Determined in accordance with type of lens used for printing.

MB: Correction value for fluctuations in amount of exposure light and variations in paper developing performance (master balance value).

NB: Negative balance (color balance) value determined in accordance with characteristics of negative film.

$K_2$: Color correction amount.

$K_1$: Density correction amount expressed by the following formula:

$$Ka \left\{ \frac{D_R + D_G + D_B}{3} - \frac{FD_R + FD_G + FD_B}{3} \right\} + Kb$$

wherein Ka and Kb are constants, and FD is the face region average density.

In this way, exposure amounts $E_j$ at which a face region can be printed properly can be obtained.

The density correction amount $K_1$ of above formula (1) may be a correction value determined by a film detecting device. The color correction amount $K_2$ may be expressed by the following formula by using the face region average density:

$$(K_2)_j = Kc \left\{ \left( FD_j - \frac{FD_R + FD_G + FD_B}{3} \right) - \left( DN_i - \frac{DN_R + DN_G + DN_B}{3} \right) \right\}$$

wherein Kc is a constant.

Further, the density correction amount $K_1$ and the color correction amount $K_2$ of formula (1) may be correction amounts determined by a film detecting device, and the exposure amounts may be determined by replacing the average density Dj of the frame to be printed of formula (1) with the face region average density FDj. Moreover, although the three-color average density of the face region is used as the characteristic amount in the fourth aspect, instead, another characteristic value such as a density histogram of the face region, the maximum density, the minimum density, the variance of the densities or the like may be used.

In step 120, the exposure amounts $E_j$ computed as described above are outputted to the driver 46. On the basis of the inputted exposure amounts $E_j$ the driver 46 moves the color correction filter 18 to a position corresponding to the exposure amounts $E_j$. The control section 40 opens the black shutter 26 for a predetermined amount of time which is determined by the exposure amounts $E_j$. In this way, the image which is positioned at the exposure position is printed onto the photographic printing paper 28 at the exposure amounts $E_j$.

In the above explanation, after the edge intensity along each direction is computed for each pixel, the maximum value of the absolute values of the edge intensities is stored as the edge intensity of the pixel which is the object of processing. The direction orthogonal to the direction in which the absolute value of the edge intensity is the greatest is stored as the edge direction of the pixel which is the object of processing. Edge searching is carried out on the basis of the stored edge intensity and edge direction. However, the present invention is not limited to the same, and all of the edge intensities along the respective directions which edge intensities are computed for each pixel may be stored. In this case, edge searching may be carried out by searching, among the respective pixels within the search range, for a pixel whose edge intensity along a direction orthogonal to the direction represented by the search edge direction pattern is greater than or equal to a predetermined value.

Figure 3A:
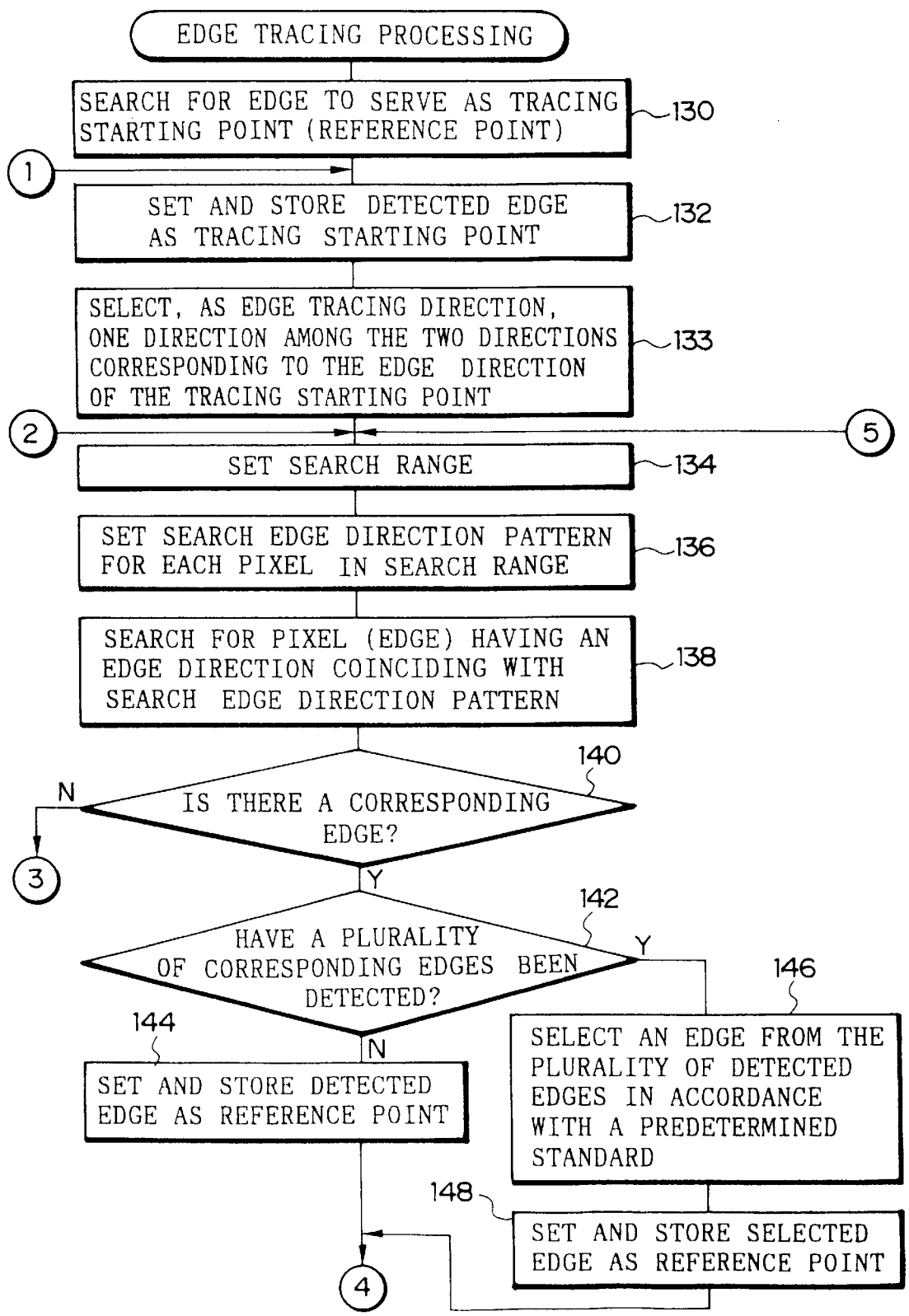
FIGS. 3A and 3B are flowcharts for explaining edge tracing processing of a first embodiment.
Figure 3B:
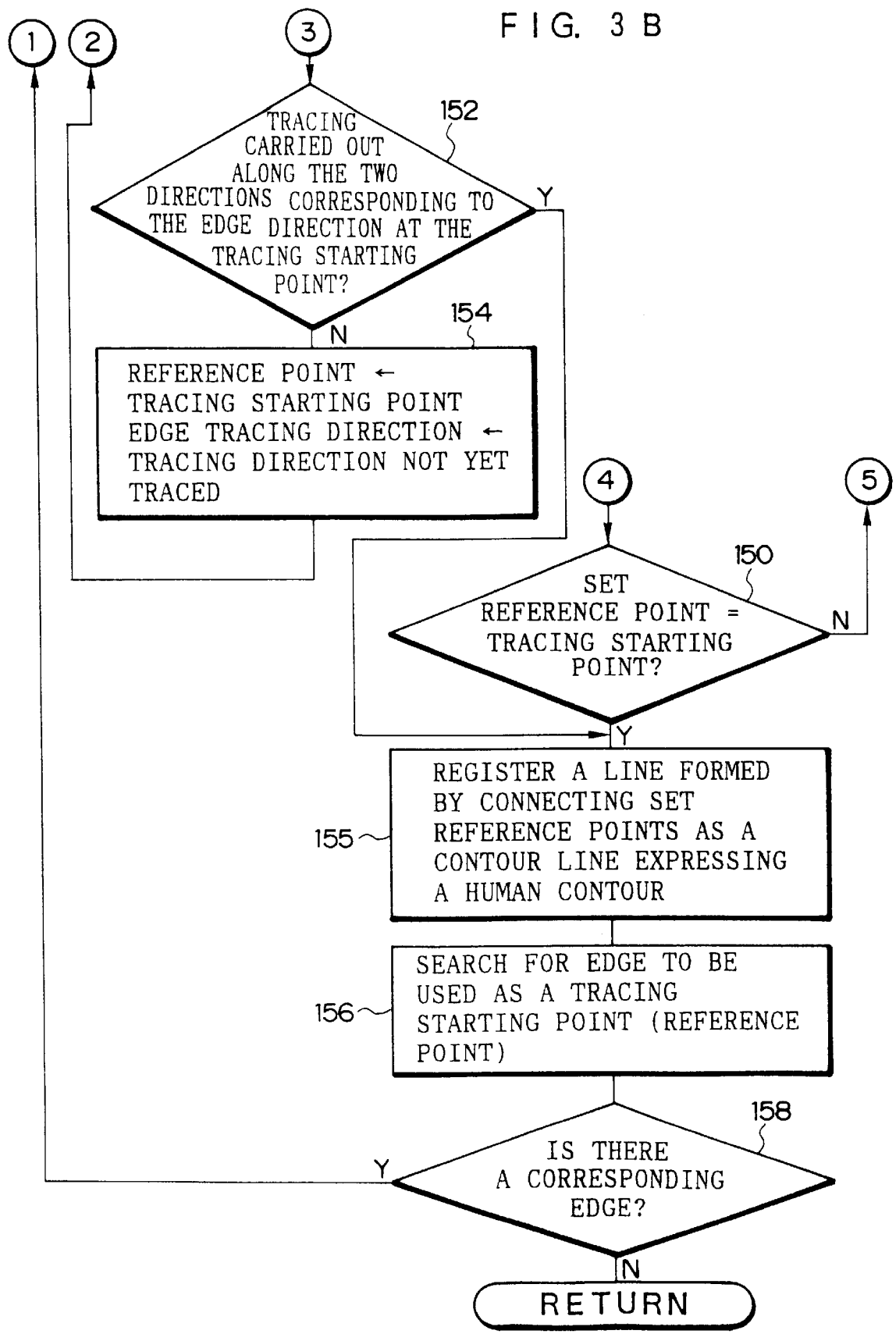
Figure 12:
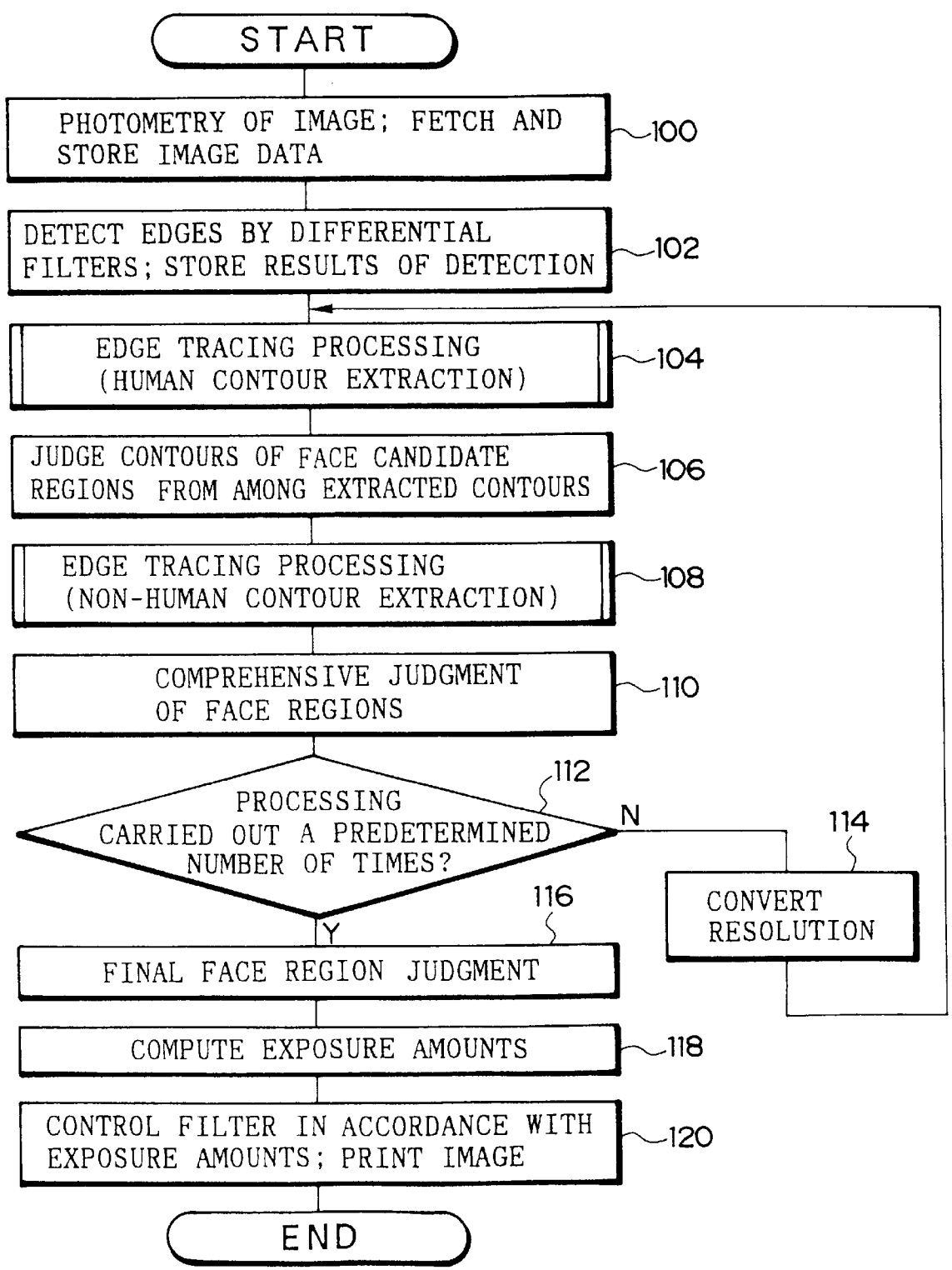
FIG. 12 is a flowchart for explaining another example of photographic printing processing relating to the embodiment.

In the edge tracing processing of FIGS. 3A and 3B, the processings of edge detection, edge tracing, face region judgment and the like are repeated while the resolution of the inputted image data is varied. However, the present invention is not limited to the same. For example, as illustrated in FIG. 12, after edge detection processing is carried out one time for inputted image data, processings such as edge tracing and face region judgment are repeated while the resolution is varied for the image data obtained by the edge detection processing. Further, in the above description, processings such as edge tracing and face judgment at the respective resolutions are carried out in series. However, a plurality of processing sections for effecting edge tracing processing, face judgment processing and the like may be provided, and edge tracing processing, face judgment processing and the like at respectively different resolutions can be carried out in parallel at the respective processing sections. In this way, the processing time can be shortened even more.

In place of changing the resolution in step 114 in FIGS. 2 and 12, as shown in FIG. 13, the range of the search distance, which is one parameter for prescribing the search range for an edge, may be changed. For example, as shown in FIG. 14A, a case in which the range of the search distance r is set such that $0 < r \leq r_1$ ($r_1$ is small) is appropriate for the extraction of a contour line of a person in a case in which the size of the region corresponding to the person within the image is small as in FIG. 9D. As shown in FIG. 14C, a case in which the range of the search distance r is set such that $r_2 < r \leq r_3$ (wherein $r_1 < r_2 < r_3$) is appropriate for the extraction of a contour line of a person in a case in which the size of the region corresponding to the person within the image is large as in FIG. 9A. In a case in which the region corresponding to the person in the image is medium-sized, it is preferable to set the range of the search distance r such that $r_1 < r \leq r_2$ as shown in FIG. 14B. In this way, even in cases in which the range of the search distance is changed discretely, in the same way as when the resolution is converted, a region corresponding to a person's face can be extracted reliably regardless of the size of the region corresponding to the person within the image.

Figure 15A:
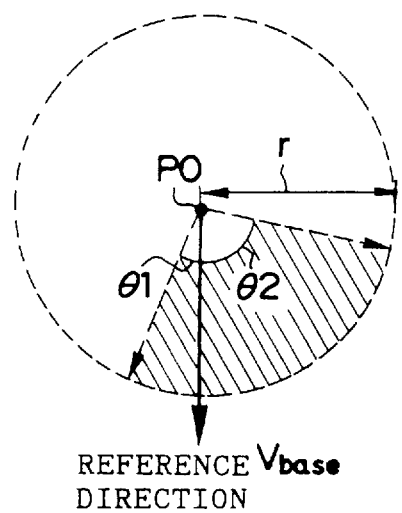
FIG. 15A is a conceptual view for explaining a case in which a search range for an edge is fixedly set with no relation to an edge direction at a reference point.

In the edge tracing processing of FIG. 3 described above, the search range for searching for the next edge is set each time on the basis of the edge direction at the reference point as shown in FIG. 6 or FIG. 8. However, the present invention is not limited to the same. For example, as illustrated in FIG. 11A, the search range may be set fixedly and without relation to the edge direction at the reference point. In the example shown in FIG. 15A, the search range (the range indicated by the hatching) is defined to be at the inner portion of a circle having a radius which is the search distance r and a center which is the reference point P0, and is defined to be within the angle range of a clockwise direction angle θ1 and a counterclockwise direction angle θ2 based on a reference direction vector Vbase oriented toward the bottom of the image. (With reference to FIG. 15B, Vbase corresponds to the "direction determined fixedly in advance" in the first aspect.)

Figure 15B:
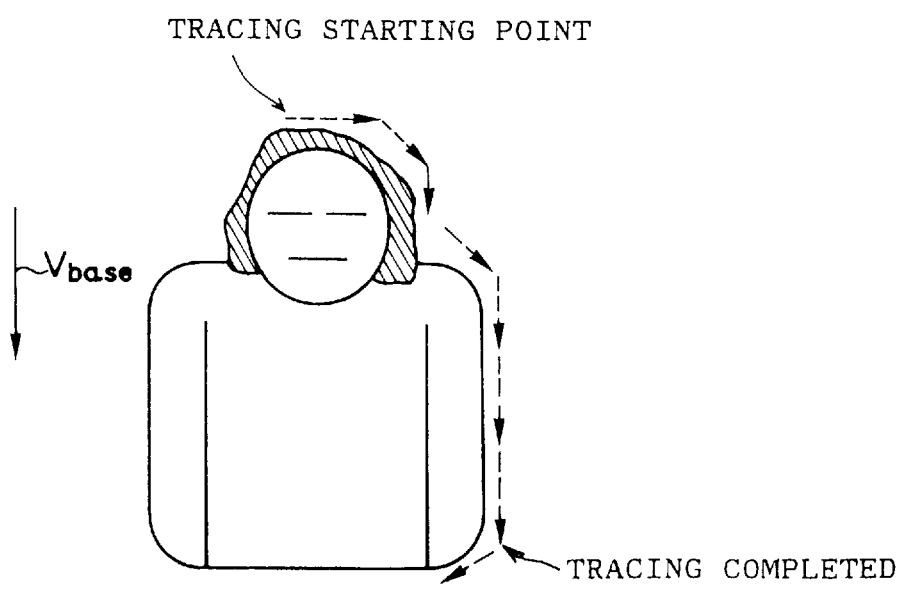
FIG. 15B is an image diagram illustrating an example of a case in which edge tracing is carried out by using the search range of FIG. 15A.

As described above, in a case in which the search range is set fixedly and without relation to the edge direction at the reference point, the direction in which edge tracing proceeds on the image is limited by the search range. For example, in a case in which the above-described search range is applied to the image illustrated in FIG. 15B and edge tracing is carried out from the tracing starting point, the contour of the right side portion of the person is extracted as shown in FIG. 15B. At the lower end portion of the contour of the right side portion of the person, edge tracing is completed at the point where the contour curves to the right at an angle of a predetermined value or greater.

In the above-described edge tracing processing of FIG. 3, the edge which is to serve as the next reference point is selected, on the basis of the edge intensity, from the plurality of edges which were detected as edges which exist within the search range and whose edge directions coincide with the edge direction pattern. However, the present invention is not limited to the same. A priority order of the positional relationships between a reference point and edges may be determined in advance, and the edge to be used as the next reference point may be selected from the aforementioned plurality of edges in accordance with the priority order and without relation to the edge intensity. For example, in a case in which the priority order is set to the order ① straight forward and ② 45 degree curve, in the example of FIG. 7C, the edge which exists at the position straight ahead of the reference point in the edge direction (i.e., the edge having an edge intensity of 10) is selected regardless of the edge intensities.

Further, in the previous explanation, the edge direction pattern is set, and the plurality of edges which exist within the search range and whose edge directions coincide with the edge direction pattern are searched for. Thereafter, the edge to be used as the next reference point is selected from the plurality of detected edges. However, the present invention is not limited to the same, and the following method may be used. A priority order of the positional relationships between a reference point and edges is determined in advance. Edge direction patterns are set for respective positions having different priorities. An edge having an edge intensity of a predetermined value or greater is searched for as the next reference point in the order of the priority, i.e., from the position having the highest priority.

More specifically, in a case in which the priority order is set to for example ① 90 degree curve, ② straight forward, first, an edge direction pattern is set for edges existing at positions corresponding to 90 degree curves with respect to the reference point. Next, edges, which exist at such positions and which have an edge direction coinciding with the aforementioned edge direction pattern and whose edge intensity is greater than or equal to a predetermined value, are searched for. When an edge satisfying these conditions is detected, the detected edge is set as the next reference point. However, if there is no edge satisfying these conditions, an edge direction pattern is set for the edge existing at the position straight ahead of the reference point, and an edge to serve as the next reference point is searched for in the same way as described above.

[Second Embodiment]

Next, a second embodiment of the present invention will be described. As the second embodiment is structured in the same manner as the first embodiment, the same reference numerals are used for the respective portions, and description of the structures thereof is omitted. Hereinafter, operation of the second embodiment will be explained.

In the edge tracing processing described in the first embodiment, only a search condition for searching on the basis of the edge intensity and the edge direction of each pixel is used. However, in the second embodiment, outer edge tracing processing is carried out in place of the above-described edge tracing processing. In the outer edge tracing processing of the second embodiment, a plurality of search conditions (a first search condition and a second search condition) are used, and respective priorities are determined for the first search condition and the second search condition.

The outer edge tracing processing relating to the second embodiment will be described hereinafter by using as an example a case in which the outer edge of a predetermined region, which is substantially elliptical and includes a region corresponding to a person's face, is extracted from the original image illustrated in FIG. 17A. (The outer edge of the right side of the predetermined region is illustrated by the solid arrow and the broken arrow in FIG. 17B.) As is clear from FIGS. 17A and 17B, the outer edge of the predetermined region to be extracted in the example of FIG. 17 is formed by regions coinciding with the edge of the original image (the contour line of the hair portion and the contour line of the jaw portion of the face), and by a region which traverses the inner portion of the hair portion.

Therefore, in the second embodiment, a search condition for searching on the basis of the edge intensity and the edge direction of each pixel in the same way as in the first embodiment, is set as the first search condition for searching/tracing a region, which coincides with an edge of the original image, of the outer edge of a predetermined region. A search condition for searching on the basis of the density value of each pixel is set as the second search condition for searching/tracing a region, which traverses the inner portion of the hair portion, of the outer edge of the predetermined region.

As will be described later, in the second embodiment, searching/tracing of the outer edge of a predetermined region is carried out at each side of the tracing starting point. In a section at one side, a section in which searching/tracing is carried out in accordance with the second search condition is interposed between sections at which searching/tracing is carried out in accordance with the first search condition. Therefore, in the second embodiment, the priority of the first search condition is set to be higher than the priority of the second search condition.

Figure 16A:
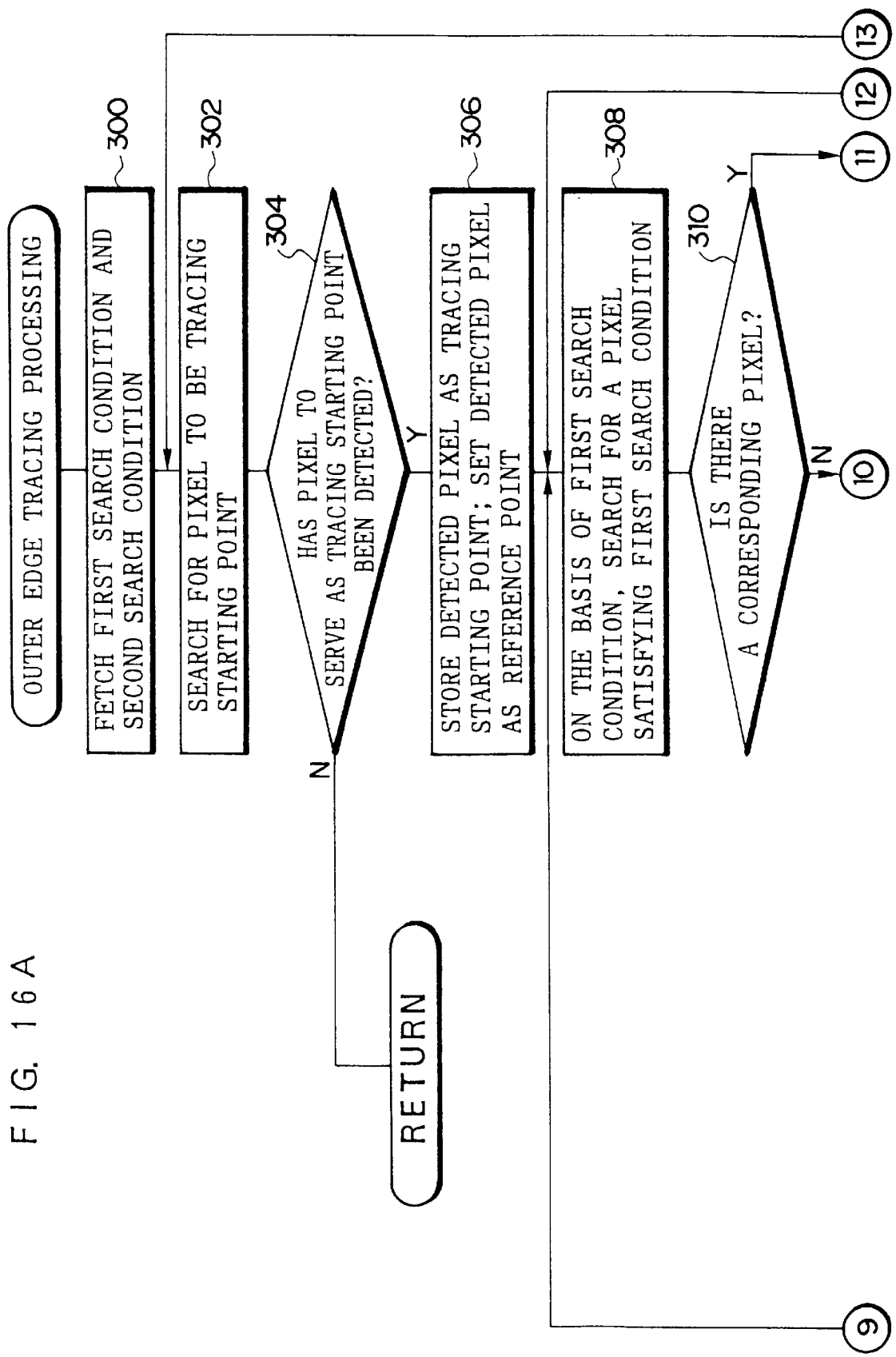
FIGS. 16A and 16B are flowcharts for explaining outer edge tracing processing of a second embodiment.
Figure 16B:
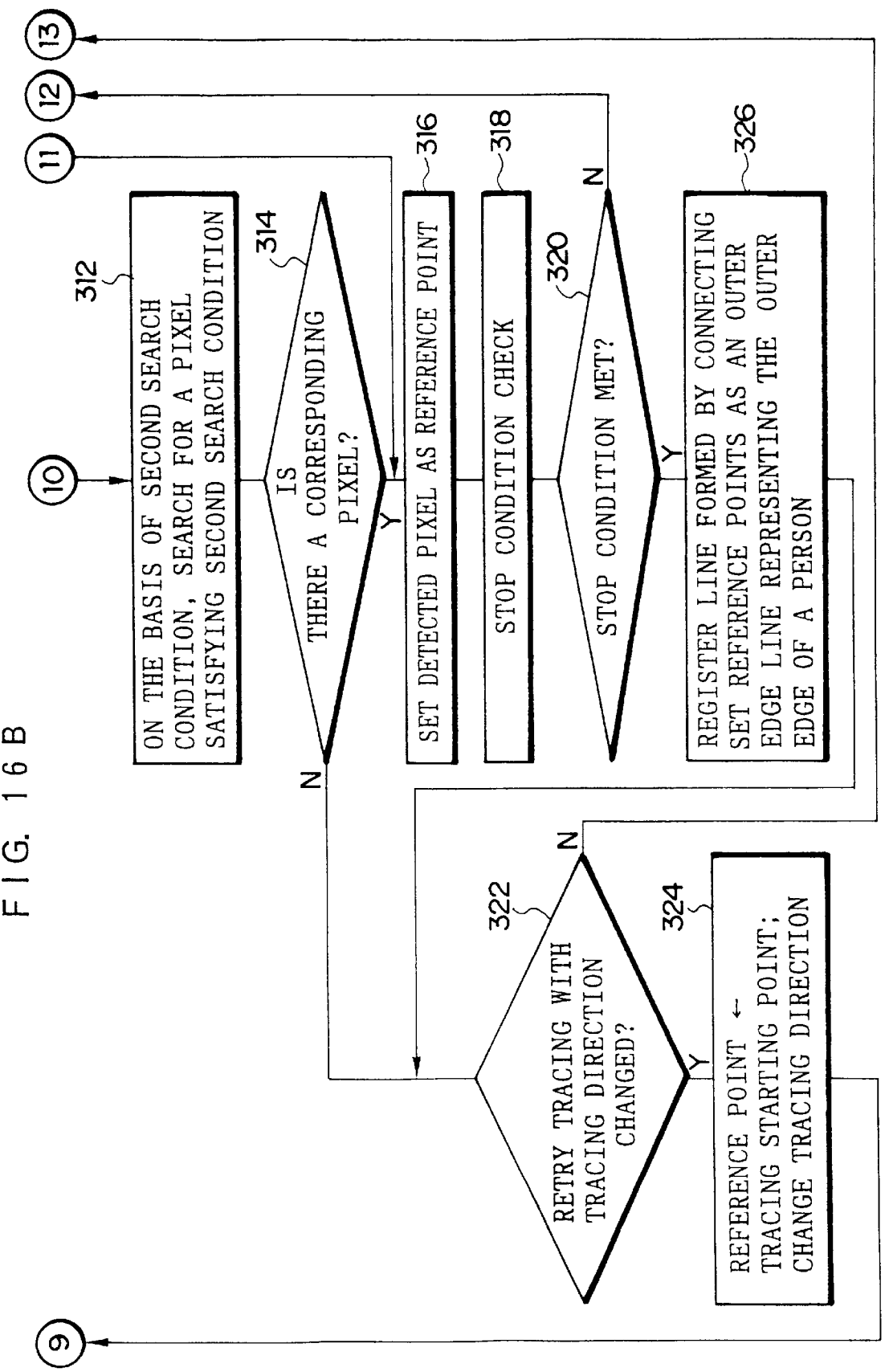

Details of outer edge tracing processing will be described with reference to the flowchart in FIGS. 16A and 16B. In step 300, information expressing the first search condition and the second search condition are fetched from a memory or the like. In step 302, a pixel which is to serve as the tracing starting point is searched for in the same way as in step 130 (see FIG. 3A) in the edge tracing processing of the first embodiment. In this way, a pixel corresponding to, for example, the peak portion of the hair portion (i.e., the pixel corresponding to the tracing starting point illustrated in FIG. 17B) is detected as the tracing starting point from the original image illustrated in FIG. 17A. In subsequent step 304, a determination is made as to whether a pixel which is to serve as the tracing starting point has been detected.

Processing ends if the determination is negative. However, if the determination is affirmative, the routine proceeds to step 306 where the detected pixel is stored in a memory or the like as the tracing starting point. Further, the detected pixel is set as the reference point, and the tracing direction at this reference point is set.

In step 308, on the basis of the fetched first search condition, pixels satisfying the first search condition are searched for. In the second embodiment, a search condition for searching on the basis of the edge intensity and the edge direction of each pixel is used as the first search condition. (For example, the search range illustrated in FIG. 6A can be used as the search range.) Therefore, in step 308, processing is carried out in the same manner as in steps 134 through 138 (see FIG. 3A) of the edge tracing processing of the first embodiment.

In subsequent step 310, a determination is made as to whether there is a pixel satisfying the first search condition (i.e., a pixel assumed to correspond to the outer edge of the predetermined region to be extracted). If the answer to the determination is affirmative, the routine proceeds to step 316 where the pixel detected by the search in accordance with the first search condition is set as the reference point. In subsequent step 318, by setting the reference point as described above, it is checked whether a predetermined stop condition for determining that tracing is to be stopped is met.

In the example illustrated in FIG. 17, the stop condition may be, for example, whether the cumulative value of the variations in the angle of the advancing direction of tracing from the tracing starting point is greater than or equal to 180 degrees. In step 320, a determination is made as to whether the stop condition is met in the previous check of the stop condition. If the answer to the determination in step 320 is negative, the routine returns to step 308, and processing from step 308 on is repeated.

Figure 17A:
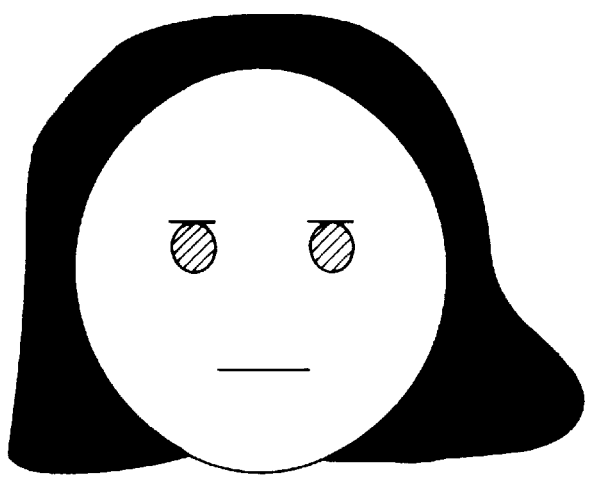
FIG. 17A is an image diagram illustrating an example of an original image.
Figure 17B:
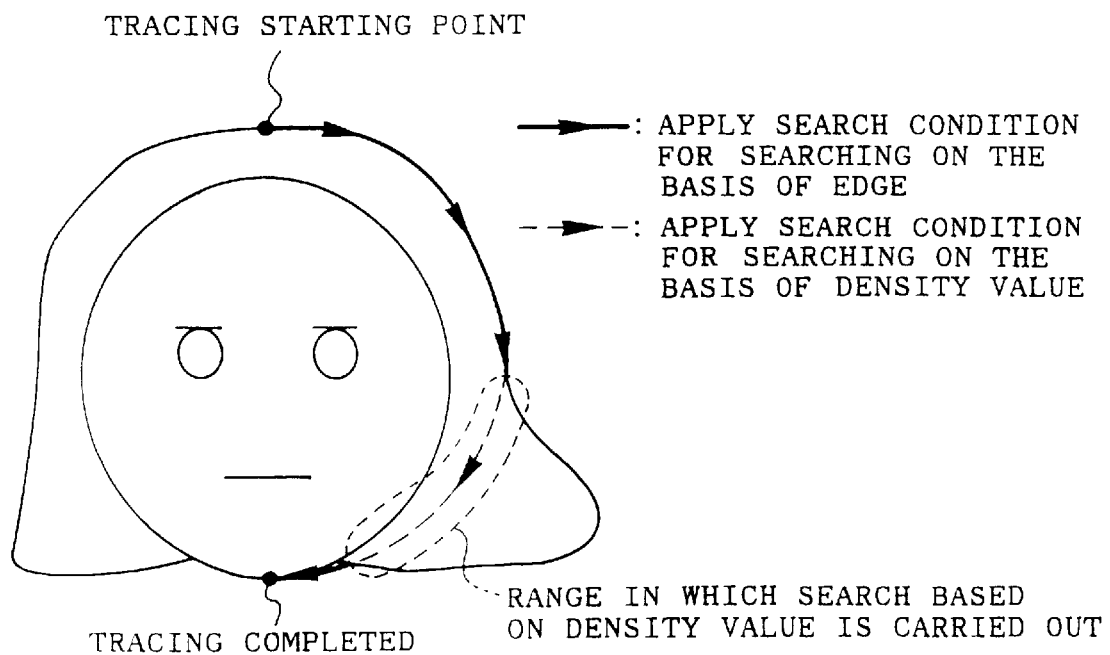
FIG. 17B is an image diagram illustrating an example of a range to which a search condition for carrying out searching on the basis of an edge is applied and a range to which a search condition for carrying out searching on the basis of density values is applied, at a time when an elliptical region including a region corresponding to a face is extracted from the original image illustrated in FIG. 17A.

In the original image illustrated in FIG. 17A, the contour line of the hair portion at the section corresponding to the right side of the peak portion of the hair portion curves gently to the right as seen from the tracing starting point. A pixel in this section which satisfies the first search condition in the search range illustrated in FIG. 6A is detected. Therefore, as illustrated by the solid line arrows in FIG. 17B, a pixel which is assumed to correspond to the outer edge of the predetermined region to be extracted is detected in this section by the first search condition.

From a predetermined portion at the lower side of the right side portion of the hair portion, the contour line of the hair portion curves greatly toward the right as seen from the tracing starting point. When the searching/tracing of pixels assumed to correspond to the outer edge of the predetermined region reaches this portion, the answer to the determination in step 310 is negative because no pixels satisfying the first search condition are detected. The routine then proceeds to step 312. In step 312, a pixel satisfying the second search condition is searched for on the basis of the second search condition. As described above, a search condition for searching on the basis of the density value of each pixel is used as the second search condition in the second embodiment. Therefore, in step 312, a search is carried out to determine whether there exists, within a predetermined search range, a pixel whose density value falls within a predetermined range.

In the second embodiment, a predetermined region, whose outer edge configuration is substantially elliptical and which includes a region corresponding to a person's face, is extracted from the original image illustrated in FIG. 17A. Therefore, the search range for the second search condition may be a search range in which a portion, which is inclined to the right (or the left) by a predetermined angle with respect to the advancing direction of tracing at the reference point, is searched for so that the advancing direction of tracing is drawn in a rightward curve (or in a leftward curve in the tracing at the opposite side of the tracing starting point). The predetermined angle may be set fixedly, or may be set and updated on the basis of the ratio of, on the one hand, the cumulative value of the variations in the angle of the advancing direction of tracing from the tracing starting point and, on the other hand, the total number of reference points set from the tracing starting point to the present reference point. In a case in which the predetermined angle is set and updated as described above, the curvature of the advancing direction of tracing at the section from the tracing starting point to the current reference point is extended, and tracing continues.

By setting the search range as described above, the searching/tracing in accordance with the second search condition proceeds so as to traverse the hair portion white drawing a rightward curve along the outer edge of the elliptical region to be extracted, as illustrated by the broken line in FIG. 17B. Therefore, a range of relatively high densities corresponding to the densities of hair portions may be set as the range of the density values.

In subsequent step 314, a determination is made as to whether there exists a pixel which satisfies the second search condition (a pixel assumed to correspond to the outer edge of the predetermined region to be extracted). When the answer to this determination is negative, no pixel satisfying the first search condition and no pixel satisfying the second search condition was detected, and it can be judged that the line formed by connecting the reference points set up to the present is not a line corresponding to the outer edge of the predetermined region to be extracted. Therefore, tracing is discontinued, and the routine proceeds to step 322.

In step 322, a determination is made as to whether tracing from the currently set tracing starting point should be retried with the tracing direction being changed. If the answer to the determination is affirmative, the routine proceeds to step 324 where the current tracing starting point is reset as the reference point and the tracing direction is changed. The routine then proceeds to step 308. In this way, in steps 308 through 320, searching/tracing, from the tracing starting point, of pixels corresponding to the outer edge of the predetermined region to be extracted is carried out again but with the tracing direction changed. If the answer to the determination in step 322 is negative, the routine returns to step 302 where a pixel to serve as the tracing starting point is searched for.

If the answer to the determination in step 314 is affirmative, the routine proceeds to step 316, and the detected pixel meeting the second search condition is set as the reference point. Accordingly, in the second embodiment, pixels satisfying either of the first search condition and the second search condition are detected, and steps 308 through 322 are repeated during the period of time that the stop condition is not met. Therefore, tracing proceeds so as to traverse the hair portion as illustrated by the broken line arrow in FIG. 17B, by setting a pixel satisfying the second search condition as a reference pixel in the section of the lower side of the right side portion of the hair portion in the original image illustrated in FIG. 17A.

In the second embodiment, the first search condition is of a higher priority than the second search condition. Searching for a pixel which satisfies the first search condition is carried out each time, and only in cases in which no pixel satisfying the first search condition is detected is searching for a pixel which satisfies the second search condition carried out. Therefore, when the tracing reaches the edge of the hair portion, by detecting a pixel satisfying the first search condition, searching in accordance with the first search condition is applied and a pixel satisfying the first search condition is set as the reference point, as illustrated by the solid line arrow at the lower side of FIG. 17B.

When the answer to the determination in step 320 is affirmative, it is determined that tracing is completed, and the routine proceeds to step 326 where a line formed by connecting the set reference points is registered as an outer edge line representing the outer edge of a region corresponding to a person's face. The routine then proceeds to step 322. In this way, the above-described processings are repeated until the determination in step 304 is affirmative as described previously.

The judgment as to whether the outer edge line, which is extracted as described above and registered in step 326, is a line corresponding to the actual outer edge of the predetermined region to be extracted may be carried out as follows. In the outer edge tracing processing, the number of times a reference point is detected by the first search condition is counted, and the number of times a reference point is detected by the second search condition is counted. Whether the outer edge line corresponds to the actual outer edge of the predetermined region to be extracted is judged on the basis of the respective ratios of the count values for the search conditions and the number of reference points forming the outer edge line. (These ratios express the frequency of application of the respective search conditions.)

In the above description, the outer edge of the region to be extracted is formed by the section, in which searching/tracing in accordance with the second search condition is carried out, being located between sections, in which searching/tracing in accordance with the first search condition is carried out. Therefore, the priority of the first search condition is set higher than that of the second search condition. However, the present invention is not limited to the same. For example, in a case in which sections in which searching/tracing is carried out in accordance with the first search condition and sections in which searching/tracing is carried out in accordance with the second search condition exist alternately, the priorities of the search conditions may be dynamically changed in order to lower the priority of the search condition used in the detection of the pixel set as the reference point the previous time. (For example, the priority or the second search condition may be set higher (i.e., searching in accordance with the second search condition is carried out first) in sections in which pixels, which are searched for in accordance with the first search condition, are repeatedly set as reference points.)

The above describes an example in which a search condition for searching on the basis of the density value of each pixel is used as the second search condition. However, the present invention is not limited to the same, and, for example, a search condition for searching on the basis of an image characteristic amount, such as the change in densities of block units respectively formed by a plurality of pixels, may be used.

More specifically, as illustrated in FIG. 18A, a plurality of blocks each formed by N pixels×N pixels are set. A reference block is determined in place of a reference point, and, by using a block as a single unit, searching is carried out for a portion corresponding to the outer edge of a region to be extracted. When a search for a portion (block) corresponding to the outer edge of the region to be extracted is carried out, the eight blocks existing at the periphery of the reference block are set as a group of adjacent blocks (search range) and the average density of each of the blocks forming the group of adjacent blocks is computed, regardless of the locus of tracing from the tracing starting point to the present reference block.

Next, codes such as those illustrated in FIG. 18B are applied to the average densities of the respective blocks forming the group of adjacent blocks. The absolute values $\Delta D_i$ of the density differences are calculated in accordance with following formula (2).

$$\Delta D_i = |B_i - B_{i+4}| \text{ (wherein i=1 to 4)} \quad (2)$$

A direction orthogonal to the direction in which the absolute value $\Delta D_i$ of the density difference is a maximum is determined to be the advancing direction of tracing. The block which is adjacent to the present reference block in the determined advancing direction of tracing is set as the next reference block.

In the above-described search based on the density differences of block units, when a region whose outer edge corresponds to a contour line along the entire periphery is extracted, the contour line can be extracted relatively accurately even in cases in which the edge intensity of the contour line is low or the contour configuration is complex or the like. Accordingly, for example, in the extraction of a region of an original image such as the region in FIG. 18C, if the above-described search condition for searching on the basis of the changes in densities of block units is applied to the searching of the portion having a complex contour configuration (the portion surrounded by the broken line in FIG. 18C), the region to be extracted can be extracted accurately.

As searches or block units, in addition to searches based on the changes in densities of block units as described above, searches can also be carried out on the basis of the hues of the block units. For example, with regard to the original image illustrated in FIG. 17A, the following type of block may be searched for: a block having, at the tracing advancing direction right side thereof, a block whose average hue within the block is flesh-colored, and having, at the tracing advancing direction left side thereof, a block whose average hue within the block is not flesh-colored. The setting of detected blocks as reference blocks is repeated. In this way, the contour of a region corresponding to a face within the original image can be traced in a clockwise direction, and a region corresponding to a face can be extracted from the original image.

The second embodiment is an example in which two types of search conditions are used. However, three or more types of search conditions may be used in accordance with the characteristics of the region to be extracted.

[Third Embodiment]

A third embodiment of the present invention will be described hereinafter. In the previously-described first embodiment, the search range with respect to the edge direction at a reference point is not changed throughout the period of time until edge tracing corresponding to a single contour line is completed. However, especially in cases in which the contour configuration of the region to be extracted is complex or the like, it is difficult to appropriately extract the contour line of the region by the method of the first embodiment.

Therefore, in the third embodiment, a portion which satisfies the search condition is searched for. While the setting of a detected portion as the next reference point is repeated, a position, on the contour of the region, of the portion which was set as the reference point is determined. The angle range with respect to the reference point is changed in accordance with the configuration of the region at the determined position. In this way, the search range is changed while edge tracing for a single contour line is being carried out. For example, extraction of only the contour line of object A among the objects A through C illustrated in FIG. 19B can be realized by the application of the edge tracing processing illustrated as a state transition diagram in FIG. 19A.

In this edge tracing processing, there are three processing patterns each having a different search range. In processing pattern 1, an edge existing at a left curve position, a right curve position, or a straight forward position with respect to the edge direction at the reference point is searched for. In processing pattern 2, an edge existing at a left curve position or a straight forward position with respect to the edge direction at the reference point is searched for. In processing pattern 3, an edge existing at a position 90 degrees to the right or at a straight forward position with respect to the edge direction at the reference point is searched for. Conditions for determining the position of the current reference point on the contour of the region (conditions 10 through 12, conditions 21 through 23, and conditions 31, 32) are determined in advance. The processing pattern switches to one of the three processing patterns 1 through 3 in accordance with whether these conditions are satisfied, so that the search range is changed. In a case in which the contour line of object B or the contour line of object C is traced by this edge tracing processing, the edge tracing processing is discontinued midway if no edge satisfying the search conditions is detected within the search ranges.

Figure 19A:
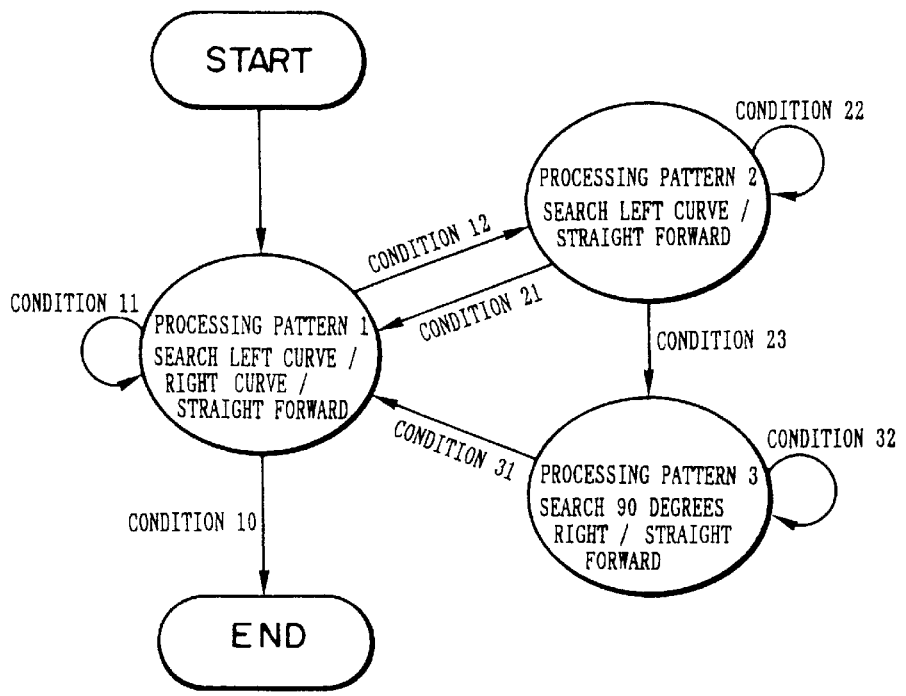
FIG. 19A is a state transition diagram for explaining an example of edge tracing processing in which a search region is changed in the course of extracting a contour line.

In the edge tracing processing illustrated as a state transition diagram in FIG. 19A, the position of the current reference point on the contour of the region to be extracted is determined on the basis of changes in the angle of the contour line being traced. However, the present invention is not limited to the same. In a case in which the sizes of the respective portions of the contour of the object to be extracted or the ratio of the sizes of the respective portions is already known, the aforementioned conditions can be set so that the position of the current reference point on the contour line of the region to be extracted is determined by also taking into account the moved distance of the edge tracing on the image or the ratio of moved distances or the like.

Figure 19B:
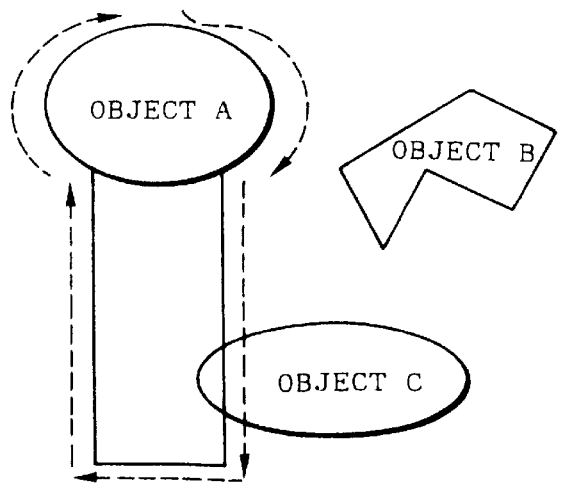
FIG. 19B is an image diagram for explaining extraction of only an object having a specific and complicated contour configuration by the edge tracing processing illustrated in FIG. 19A.

The edge tracing processing illustrated in FIG. 19A is a specific processing in a case in which only the contour line of object A illustrated in FIG. 19B is extracted. Hereinafter, a general-use outer edge tracing processing will be described in which the position of the present reference point on the outer edge of the region to be extracted is determined, and the search condition is changed in accordance with the results of determination.

In this outer edge tracing processing, a plurality of characteristic points are set in advance on the outer edge of the region to be extracted. As one example, FIG. 20 illustrates a case in which six characteristic points (characteristic point $P_1$ through characteristic point $P_6$) are set in the clockwise direction on the outer edge line (the contour line in this case) of the object A illustrated in FIG. 19B. The tracing processing at a section between a characteristic point $P_n$ and a characteristic point $P_{n+1}$ is referred to hereinafter as mode (n, n+1).

Next, a search condition for searching for a pixel (or a block) assumed to be positioned on the outer edge, a continuation judging condition for judging whether searching/tracing is to continue in the present mode, an arrival judging condition for judging whether a characteristic point has been reached (whether tracing is to be switched to the next mode), and a stop judging condition for judging whether searching/tracing is to be stopped, are set on the basis of predetermined image characteristic amounts (e.g., the edge intensity and direction of each pixel) for each mode in accordance with the characteristics of the region to be extracted at the sections between the respective characteristic points. The set conditions are stored in a memory in correspondence with the respective modes.

For example, the processing pattern 1, the processing pattern 2, the processing pattern 3 in FIG. 19A or the like can be can be set as the search conditions. As an example, condition 11, condition 22, condition 32 in FIG. 19A or the like may be set for the continuation judging condition. For example, condition 12, condition 21, condition 31 of FIG. 19A or the like may be set as the arrival judging condition. Further, the following are examples of conditions which may be set as the stop judging condition: condition 10, a judging condition judging whether searching/tracing has reached a peripheral portion of the image, a judging condition judging whether the set number of reference points has reached an upper limit value, a judging condition judging whether the difference in angles of the edge direction and the reference direction at the set reference point has exceeded an upper limit value, or the like.

Figure 21A:
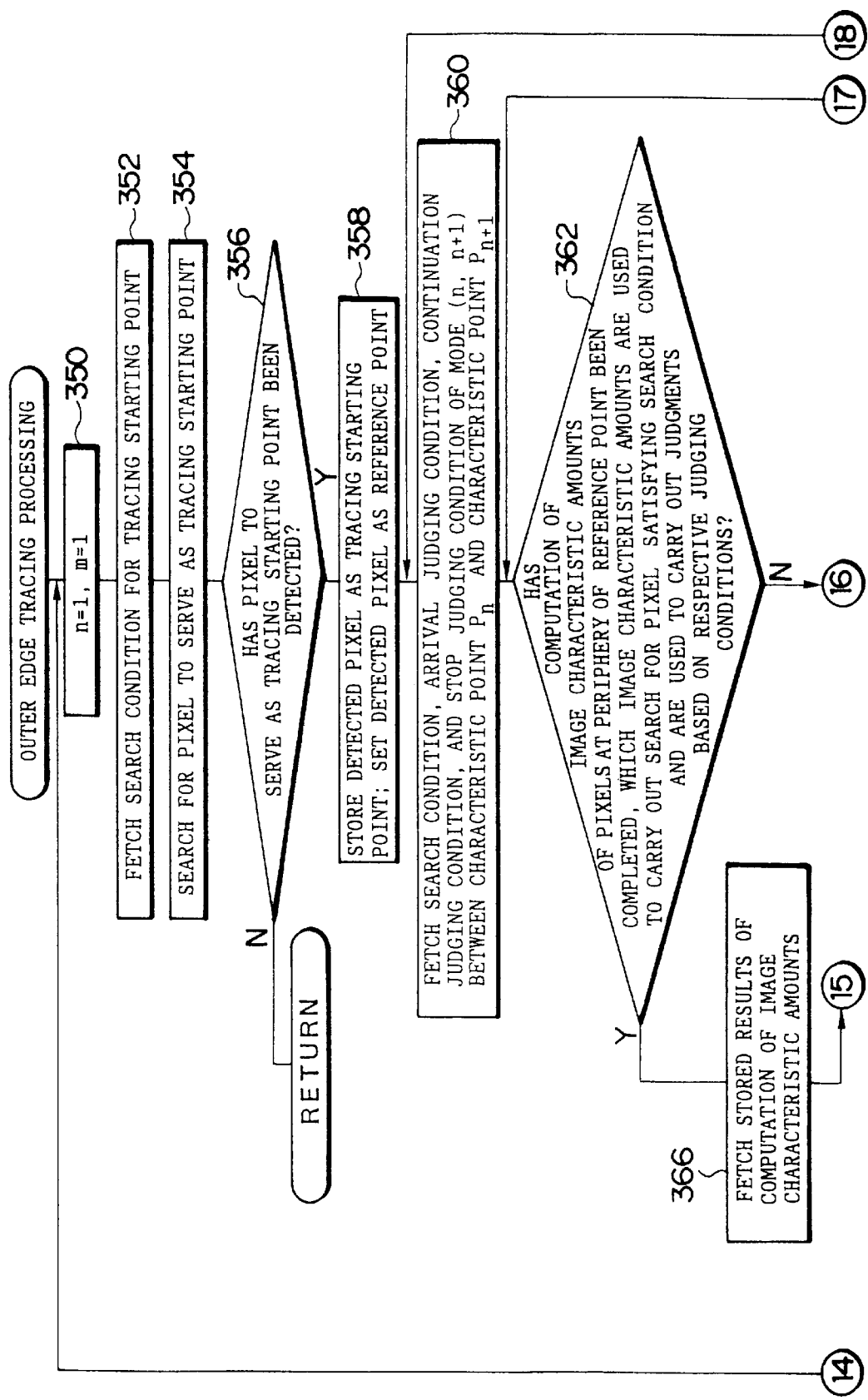

Outer edge tracing processing relating to the present third embodiment and carried out by using the above-described conditions will be described with reference to the flowcharts in FIGS. 21A and 21B. In step 350, 1 is assigned to the counter n and the counter m. In step 352, the search condition for searching for a pixel to serve as the tracing starting point is fetched. In step 354, a pixel which will be used as the tracing starting point is searched for on the basis of the fetched search condition. The search condition is stored as the search condition for the mode (0,1). The search in step 354 may be called the "search at mode (0,1)".

In step 356, a determination is made as to whether a pixel which will serve as the tracing starting point has been detected. If the answer to the determination is negative, processing ends. If the determination is affirmative, in step 358, the detected pixel is stored in the memory as the tracing starting point and is set as the reference point. In subsequent step 360, tracing processing is carried out under the assumption that the detected tracing starting point is characteristic point $P_1$.

More specifically, in step 360, the search condition, the continuation judging condition, the arrival judging condition, and the stop judging condition of the mode (n,n+1), for carrying out tracing processing in the section between characteristic point $P_n$ (initially, n=1) and characteristic point $P_{n+1}$, are fetched. In subsequent step 362, a determination is made as to whether calculation of the image characteristic amounts of the pixels at the periphery of the reference point has been completed, which image characteristic amounts are used to carry out the search for a pixel satisfying the fetched search condition and are used to carry out the judgments based on the respective judging conditions which are the continuation judging condition, the arrival judging condition, and the stop judging condition.

If the answer to the determination in step 362 is negative, in step 364, computation of the image characteristic amounts is carried out and the results of computation are stored in a memory, and the routine proceeds to step 368. Because the image characteristic amounts computed once are stored in the memory, when the answer to the determination in step 362 is affirmative, the results of computation of the image characteristic amounts stored in the memory are fetched in step 366, and the routine proceeds to step 368. In this way, computation of the same image characteristic amounts a plural number of times can be avoided, and the processing time can be shortened.

In step 368, a pixel meeting the search condition of the mode (n,n+1) is searched for on the basis of the image characteristic amounts of the pixels at the periphery of the reference point, which image characteristic amounts were acquired by computation or by being fetched from the memory. Further, the judgments of the respective judging conditions are also carried out in step 368. Among these judging conditions, the judgments in accordance with the continuation judging condition and the arrival judging condition correspond to the "judgment as to whether the set reference point corresponds to the plurality of characteristic points or to any of the characteristic points" in the above seventh aspect. In subsequent step 370, the results of the above search and judgments are determined, and in a case in which a pixel satisfying the search condition is detected and the continuation judging condition is established, the routine proceeds to step 372.

If the continuation judging condition (e.g., condition 11 in FIG. 19A or the like) is established, it can be determined that the pixel detected by the search this time corresponds to the section between the characteristic point n and the characteristic point n+1. Therefore, in order to continue tracing in the present mode, in step 372, the pixel detected by the previous search is set as the reference point, and thereafter, the routine proceeds to step 362. In this way, searching and judgments are carried out by using the search condition, the continuation judging condition, the arrival judging condition and the stop judging condition of the same mode as the previous time.

On the other hand, in step 370, if a pixel satisfying the search condition is detected and the arrival judgment condition is established, the routine proceeds to step 374. When the arrival judgment condition (e.g., condition 12 in FIG. 19A or the like) is established, it can be determined that the pixel detected this time corresponds to characteristic point $P_{n+1}$, and that the searching/tracing of pixels assumed to correspond to the outer edge of the region to be extracted has reached the characteristic point $P_{n+1}$. (For example, when condition 12 in FIG. 19A is established, it can be determined that the characteristic point $P_2$ has been reached.) Therefore, in step 374, the pixel detected this time is set as the reference point. Thereafter, in step 376, the value of the counter n is incremented by 1, and the process returns to step 360.

By updating the value of the counter n, respective conditions corresponding to the next mode, in which the search and judgments are different than the previous time, are fetched in step 360. From step 362 on, a search and judgments sire carried out by using the respective newly-fetched conditions. As described above, while the continuation judging condition or the arrival judging condition are established, it can be determined that pixels assumed to correspond to the outer edge of the region to be extracted can be extracted accurately, and the above processing continues.

In step 370, if neither the continuation judging condition nor the arrival judging condition are established, or if a stop judging condition such as "tracing starting point has been reached" or the like is established, the routine proceeds to step 378. In step 378, a determination is made as to whether the tracing starting point has been reached via all of the characteristic points which were set in advance. If the answer to the determination is affirmative, the routine proceeds to step 386 where a line formed by connecting the set reference points is registered in a memory or the like as an outer edge line representing the outer edge of the region to be extracted, and the routine then returns to step 350.

In step 378, in place of the above-described determination, a determination may be made as to whether the line formed by connecting the extracted reference points is a line corresponding to the outer edge of the region to be extracted, on the basis of the ratio between the number of characteristic points through which the line passes and the total number of characteristic points set in advance, or on the basis of the number of set reference points, or on the basis of the ratio between the number of set reference points and the peripheral length of the extracted outer edge line, or the like.

If the determination in step 378 is negative, the routine proceeds to step 380 where a determination is made as to whether there is no possibility that the current tracing starting point is a point on the outer edge of the region to be extracted. In the above-described processing, as is clear from the fact that 1 is assigned to the counter n, searching is carried out under the assumption that the pixel detected as the tracing starting point in the search of step 354 corresponds to the characteristic point $P_1$. However, in a case in which the orientation, on the image, of the region to be extracted is not fixed or the like, there exists the possibility that the pixel detected as the tracing starting point corresponds to a characteristic point other than the characteristic point $P_1$.

In consideration of such a case, in the present third embodiment, when the determination in step 378 is negative, it is assumed that the pixel detected as the tracing starting point corresponds to another of the plurality of characteristic points other than the characteristic point $P_1$, and the processes of steps 360 through 376 are repeated a plural number of times. Accordingly, while tracing processing is repeated a plural number of times with the pixel detected as the tracing starting point assumed to correspond to a different characteristic point, the determination in step 380 is negative, and the routine proceeds to step 382.

In step 382, the pixel detected as the tracing starting point by the search in step 354 is set as the reference point, and a predetermined value $k_m$ is assigned to the counter n so that the initial value is changed. In subsequent step 384, the value of the counter m is incremented by 1, and the routine returns to step 360. In this way, each time the determination in step 378 is negative, the value of the counter n is set to $k_1$, $k_2$, . . . and the processes of steps 370 through 376 are repeated. Accordingly, even in cases in which the orientation, on the image, of the region to be extracted is not fixed, the region to be extracted can be extracted if the pixel detected as the tracing starting point is a point on the outer edge of the region to be extracted.

The values of the predetermined value $k_m$ should satisfy $1 < k_1 < k_2 < \ldots$ . The values of the predetermined value $k_m$ may be set such that the increase in the value at the time that the value of the counter n changes from $1 \to k_1 \to k_2 \to \ldots$ is constant (e.g., 1 or an integer greater than 1). Further, the values of the predetermined value $k_m$ may be set such that the increase in the value varies in accordance with the degree of asymmetry or the like of the outer edge configuration of the region to be extracted.

In a case in which the pixel detected as the tracing starting point is not a point on the outer edge of the region to be extracted, even if processing is repeated with the initial value of the counter n being changed as described above, a line representing the outer edge of the region to be extracted will not be detected. Therefore, due to an affirmative determination in step 380, the routine returns to step 350, and a search for a pixel to serve as the tracing starting point is carried out again.

In the flowchart in FIG. 21, tracing processing is carried out on the basis of a single image characteristic amount. However, the present invention is not limited to the same. Tracing processing may be carried out by using a plurality of conditions (search condition, continuation judging condition, arrival judging condition, stop judging condition) for carrying out a search or judgments on the basis of respectively different image characteristic amounts, as described in the second embodiment. Examples of the contents of the search condition, the continuation judging condition, the arrival judging condition and the stop judging condition in such a case are shown in following Table 1. (Note that conditions corresponding to a certain single mode are illustrated.)

TABLE 1

|  | Edge Intensity | Edge Direction | Density Range | Hue | — |
|---|---|---|---|---|---|
| Search Condition | Search Range: A11 Edge Intensity Computation Formula: F11 Judgment Threshold: T11 | Search Range: A11 Edge Direction Computation Formula: F12 Judgment Threshold: T12 | Search Range: A13 Density Data Computation Formula: F13 Judgment Threshold: T13 | Search Range: A14 Hue Data Computation Formula: F14 Judgment Threshold: T14 | — |
| Continuation Judging Condition | Search Range: A21 Edge Intensity Computation Formula: F21 Judgment Threshold: T21 | Search Range: A21 Edge Direction Computation Formula: F22 Judgment Threshold: T22 | Search Range: A23 Edge Intensity Computation Formula: F23 Judgment Threshold: T23 | Search Range: A24 Edge Direction Computation Formula: F24 Judgment Threshold: T24 | — |
| Arrival Judging Condition | Search Range: A31 Edge Intensity Computation Formula: F31 Judgment Threshold: T31 | Search Range: A31 Edge Direction Computation Formula: F32 Judgment Threshold: T32 | Search Range: A33 Density Data Computation Formula: F33 Judgment Threshold: T33 | Search Range: A34 Hue Data Computation Formula: F34 Judgment Threshold: T34 | — |
| Stop Condition | — | — | not used | not used | — |

In a case in which a plurality of types of conditions are used, for example, as described in the second embodiment, a priority may be determined for each of the plurality of conditions. For the condition having the highest priority, in a case in which a pixel satisfying the search condition is not detected or in a case in which both the continuation judging condition and the arrival judging condition are both not established, processing can be carried out by using the condition having the next highest priority. Further, the priorities for the plurality of types of conditions can be determined separately for each mode in accordance with the characteristics of the respective portions of the region to be extracted.

In the above description, a region corresponding to a person is extracted from an image recorded on the negative film 12, and the amounts of exposure at the time of printing the image onto the photographic printing paper 28 are determined. However, the present invention can be applied to various types of recording media for images such as other papers or other photographic films such as reversal film or the like. The present invention can also be applied to the determination of copy conditions at the time of copying an image by using an electrophotographic method or the like.

Images to which the present invention is applied and from which a specific region is extracted are not limited to images recorded on a photographic film. For example, in the mass production of parts or articles or the like, the state in which the manufactured parts or articles are conveyed in order may be picked-up or monitored, and an image expressing the state in which a part or article is conveyed may be extracted from the pick-up signal at a predetermined timing. A region corresponding to the part or article can be extracted from the extracted image as the specific region. In this case, because the characteristics of the part or the article are known in advance, the search condition can be determined easily. The specific region extracted in accordance with the present invention can be used, for example, to automatically inspect the manufactured part, article or the like.

What is claimed is:

1. A method of extracting a region of a specific contour configuration from an image comprises:

a) measuring a density or a luminance of each of a plurality of portions of the image;

b) determining an amount of change in density or an amount of change in luminance in a plurality of directions at each of said plurality of portions of the image, according to the density or the luminance measured in said measuring step;

c) setting, as a reference point, a portion from said plurality of portions having an amount of change in density along a predetermined direction of the image or having an amount of change in luminance along a predetermined direction of the image is greater than or equal to a predetermined value;

d) setting, as a search range for proximate portions near the reference point, a range of portions whose distance from the reference point is within a predetermined distance and which is within an angle range with respect to the reference point, wherein the angle range is determined in accordance with a contour configuration in a direction determined in advance, or a direction in which the amount of change in density at the reference point is greater than or equal to a predetermined value, or the amount of change in luminance at the reference point is greater than or equal to a predetermined value;

e) setting a search direction pattern which is to be searched at respective portions in said search range and which expresses a direction in which the density or the luminance changes, based on the contour configuration in a direction determined in advance, or a direction in which the amount of change in density at the reference point is greater than or equal to a predetermined value, or the amount in change in luminance at the reference point is greater than or equal to a predetermined value;

f) searching for portions which exist within said search range and whose amount of change in density along a direction expressed by said search direction pattern or amount of change in luminance along the direction expressed by said search direction pattern is greater than or equal to a predetermined value to thereby satisfy a search condition, and wherein when a portion which satisfies the search condition is detected, setting the detected portion as a next reference point; and g) extracting, as a contour line a line formed by connecting a plurality of portions of the image which were set in order as reference points.

2. A method according to claim 1, wherein when a plurality of portions are detected as portions satisfying said search condition, said method further comprises performing at least one of:

setting as the next reference point the portion, among said plurality of portions, whose amount of change in density along the direction expressed by said search direction pattern or amount of change in luminance along the direction expressed by said search direction pattern is the greatest, and setting as the next reference point the portion, among said plurality of portions, which is positioned at a position having a higher priority, in accordance with a predetermined priority of the position of the next reference point with respect to a current reference point.

3. A method according to claim 2, wherein the angle range corresponds to a contour configuration of a person;

said method further comprising:
judging whether the extracted contour line corresponds to a person's face; and
when it is judged that the extracted contour line corresponds to a person's face, determining copy conditions for copying the image onto a copy material, on the basis of an image characteristic amount in the region judged to be region corresponding to a person's face.

4. A method according to claim 3, further comprising:

setting, as a second angle range, an angle range corresponding to a contour configuration which is different than the contour of a person; and searching for portions which exist within said search range using said second angle range and whose amount of change in density along a direction expressed by said search direction pattern or amount of change in luminance along the direction expressed by said search direction pattern is greater than or equal to a predetermined value to thereby satisfy a second search condition, and wherein when a portion which satisfies the second search condition is detected, setting the detected portion as a second next reference point; and extracting, as a second contour line a line formed by connecting a plurality of portions of the image which were set as second reference points;

judging whether the region extracted in said step (g) corresponds to a person's face by also taking into consideration the arrangement of the second extracted contour line.

5. A method according to claim 1, further comprising:

while setting said search range and said search direction pattern, and searching for a portion which satisfies said search condition, and setting of a detected portion as the next reference point, determining a position on the contour, of a portion which has been set as the reference point; and changing the angle range with respect to the reference point, in accordance with the configuration of the contour at the determined position.

6. A method according to claim 5, wherein the angle range corresponds to a contour configuration of a person;

said method further comprising:
judging whether the extracted contour line corresponds to a person's face; and
when it is judged that the extracted contour line corresponds to a person's face, determining copy conditions for copying the image onto a copy material, on the basis of an image characteristic amount in the region judged to be region corresponding to a person's face.

7. A method according to claim 6, further comprising:

setting, as a second angle range, an angle range corresponding to a contour configuration which is different than the contour of a person; and searching for portions which exist within said search range using said second angle range and whose amount of change in density along a direction expressed by said search direction pattern or amount of change in luminance along the direction expressed by said search direction pattern is greater than or equal to a predetermined value to thereby satisfy a second search condition, and wherein when a portion which satisfies the second search condition is detected, setting the detected portion as a second next reference point; and extracting, as a second contour line a line formed by connecting a plurality of portions of the image which were set as second reference points;

judging whether the region extracted in said step (g) corresponds to a person's face by also taking into consideration the arrangement of the second extracted contour line.

8. A method according to claim 1, wherein the angle range corresponds to a contour configuration of a person;

said method further comprising:
judging whether the extracted contour line corresponds to a person's face; and
when it is judged that the extracted contour line corresponds to a person's face, determining copy conditions for copying the image onto a copy material, on the basis of an image characteristic amount in the region judged to be region corresponding to a person's face.

9. A method according to claim 8, further comprising:

setting, as a second angle range, an angle range corresponding to a contour configuration which is different than the contour of a person; and searching for portions which exist within said search range using said second angle range and whose amount of change in density along a direction expressed by said search direction pattern or amount of change in luminance along the direction expressed by said search direction pattern is greater than or equal to a predetermined value to thereby satisfy a second search condition, and wherein when a portion which satisfies the second search condition is detected, setting the detected portion as a second next reference point; and extracting, as a second contour line a line formed by connecting a plurality of portions of the image which were set as second reference points;

judging whether the region extracted in said step (g) corresponds to a person's face by also taking into consideration the arrangement of the second extracted contour line.

10. The method according to claim 1, said method further comprising:

repeating said steps (a)–(g) in sequence, wherein each of said plurality of portions is reduced in size and said the sequence is performed, until the sequence of steps (a)–(g) is performed a predetermined number of times;

judging whether a region of the image demarcated by the extracted contour line corresponds to a person's face.

11. The method according to claim 1, wherein said angle range subtends an arc which is less than half of a full circle.

12. The method according to claim 1, said method further comprising:

repeated said steps (a)–(g) in sequence, wherein said predetermined distance is changed and the sequence is performed, until the sequence of steps (a)–(g) is performed a predetermined number of times;

judging whether a region of the image demarcated by the extracted contour line corresponds to a person's face.

* * * * *